(12) United States Patent
Aoki et al.

(10) Patent No.: US 7,184,010 B2
(45) Date of Patent: Feb. 27, 2007

(54) LIQUID CRYSTAL DISPLAY DEVICE

(75) Inventors: Yoshinori Aoki, Mobara (JP); Mitsuru Goto, Chiba (JP); Masato Sawahata, Ichihara (JP); Hiroshi Watanabe, Mobara (JP); Yuuichi Numata, Mobara (JP)

(73) Assignees: Hitachi, Ltd., Tokyo (JP); Hitachi Device Engineering Co., Ltd., Chiba-ken (JP)

( * ) Notice: Subject to any disclaimer, the term of this patent is extended or adjusted under 35 U.S.C. 154(b) by 0 days.

(21) Appl. No.: 10/237,045

(22) Filed: Sep. 9, 2002

(65) Prior Publication Data

US 2003/0067429 A1 Apr. 10, 2003

(30) Foreign Application Priority Data

Oct. 2, 2001 (JP) ............................. 2001-305930

(51) Int. Cl.
*G09G 3/36* (2006.01)
(52) U.S. Cl. .......................................... 345/99; 345/100
(58) Field of Classification Search ................. 345/87, 345/90, 92, 98–100, 103; 349/151, 152, 349/33, 34
See application file for complete search history.

(56) References Cited

U.S. PATENT DOCUMENTS

| | | | | |
|---|---|---|---|---|
| 6,462,723 B1 * | 10/2002 | Yamazaki et al. | ............. | 345/82 |
| 6,469,767 B2 * | 10/2002 | Onishi | ........................ | 349/149 |
| 6,710,839 B2 * | 3/2004 | Komeno et al. | ............ | 349/149 |
| 6,738,109 B2 * | 5/2004 | Jeon | ............................. | 349/43 |
| 6,738,122 B2 * | 5/2004 | Lim | ............................. | 349/149 |
| 6,747,723 B2 * | 6/2004 | Hanakawa et al. | ......... | 349/147 |
| 6,747,724 B2 * | 6/2004 | Onaka et al. | ................ | 349/149 |
| 6,760,091 B2 * | 7/2004 | Uehara | ........................ | 349/152 |
| 6,768,533 B2 * | 7/2004 | Hanakawa et al. | ......... | 349/153 |

FOREIGN PATENT DOCUMENTS

| | | |
|---|---|---|
| JP | 06-034987 | 7/1992 |
| JP | 2001-100240 | 7/1992 |
| JP | 09-329799 | 2/1997 |
| JP | 2000-171818 | 12/1998 |
| JP | 2000-284754 | 3/1999 |
| JP | 2001-091967 | 9/1999 |
| JP | 2001-196918 | 1/2000 |
| JP | 2003-029289 | 1/2001 |
| JP | 2002-311451 | 4/2001 |

* cited by examiner

*Primary Examiner*—Bipin Shalwala
*Assistant Examiner*—Jeff Piziali
(74) *Attorney, Agent, or Firm*—Reed Smith LLP; Stanley P. Fisher, Esq.; Juan Carlos A. Marquez, Esq.

(57) ABSTRACT

The present invention provides a liquid crystal display device which can be used in a miniaturized portable device, wherein the liquid crystal display device has a small area for mounting driving circuits and allows the free mounting of the driving circuits. In the liquid crystal display device having a liquid crystal display element and a liquid crystal driving circuit, the liquid crystal driving circuit is mounted on one side of the liquid crystal display panel. Driving circuits for driving scanning signal lines are provided in plural. The scanning signal line driving circuits sandwich a circuit for driving video signal lines and are arranged in line with the video signal line driving circuit. Lines for transmitting signals to the scanning signal lines are connected to the scanning signal lines from left and right sides of the liquid crystal display panel so as to perform a control of the driving circuits in response to external signals.

5 Claims, 28 Drawing Sheets

| D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|
| 0 | 0 | 0 | * | GON | * | * | * | * | * | * | * | * | * | * | SLP |
| 1 | 1 | 0 | 0 | 0 | GS | NL4 | NL3 | NL2 | NL1 | NL0 | SC4 | SC3 | SC2 | SC1 | SC0 |
| 1 | 1 | 1 | 0 | 0 | 0 | 0 | 0 | 0 | 0 | 0 | 0 | 0 | 0 | FL1 | FL0 |

ID

LIQUID CRYSTAL DISPLAY DEVICE

BACKGROUND OF THE INVENTION

The present invention relates to a liquid crystal display device, and more particularly to an effective technique for driving circuits of a liquid crystal display device used in a portable display device.

Liquid crystal display devices adopting a STN (Super Twisted Nematic) method or a TFT (Thin Film Transistor) method have been widely used as display devices of notebook type personal computers or the like. The liquid crystal display device includes a liquid crystal display panel and driving circuits which drive the liquid crystal display panel.

Among these liquid crystal display devices, the liquid crystal display devices which are used as display devices of portable terminal equipment such as portable telephones are increasing in number. In adopting the liquid crystal display device as the display device of the portable terminal equipment, a liquid crystal display device which is further miniaturized and exhibits smaller power consumption than a conventional liquid crystal display device has been requested.

As a drawback which is brought about by the miniaturization of the portable terminal equipment, the reduction of space for mounting driving circuits of the liquid crystal display device has been pointed out. There is a demand for a so-called centering of screen which is a method characterized by aligning the center line of the portable terminal display device with the center of a display screen. However, in meeting such a demand, positions where driving circuits can be mounted are restricted and much consideration is necessary to determine the arrangement of the driving circuits. Further, although the driving circuits are mounted on two neighboring sides of the display screen in the conventional liquid crystal display device, there is a demand for a so-called three-side-free arrangement which mounts the driving circuits on only one side. Further, there is a demand for the reduction of the number of mounting parts in order to miniaturize the mounting area.

The present invention has been made to solve the above-mentioned drawbacks of the prior art and it is an object of the present invention to provide a technique which can realize optimum driving circuits in a miniaturized liquid crystal display device.

The above-mentioned object, other objects and novel features of the present invention will be made apparent by the description of this specification and attached drawings.

SUMMARY OF INVENTION

Here will be briefly explained a representative invention among the inventions disclosed in this specification.

In a liquid crystal display device including liquid crystal display elements and a liquid crystal driving circuit, a liquid crystal driving circuit is mounted on one side of a liquid crystal display panel, driving circuits for driving scanning signal lines are formed in plural, the plurality of scanning signal line driving circuits are formed such that the scanning signal line driving circuits sandwich a circuit which drives video signal lines and are arranged parallel to the video signal driving circuit, lines for transmitting signals to the scanning signal lines are connected to the scanning signal lines from left and right sides of the liquid crystal display panel, and a control of the driving circuits is performed in response to external signals.

DETAIL DESCRIPTION OF THE PREFERRED EMBODIMENTS

Preferred embodiments of the present invention are explained in detail hereinafter in conjunction with attached drawings. In all drawings which explain the embodiments, parts which have identical functions are given same symbols and the repeated explanation of the parts is omitted.

Figure 1:
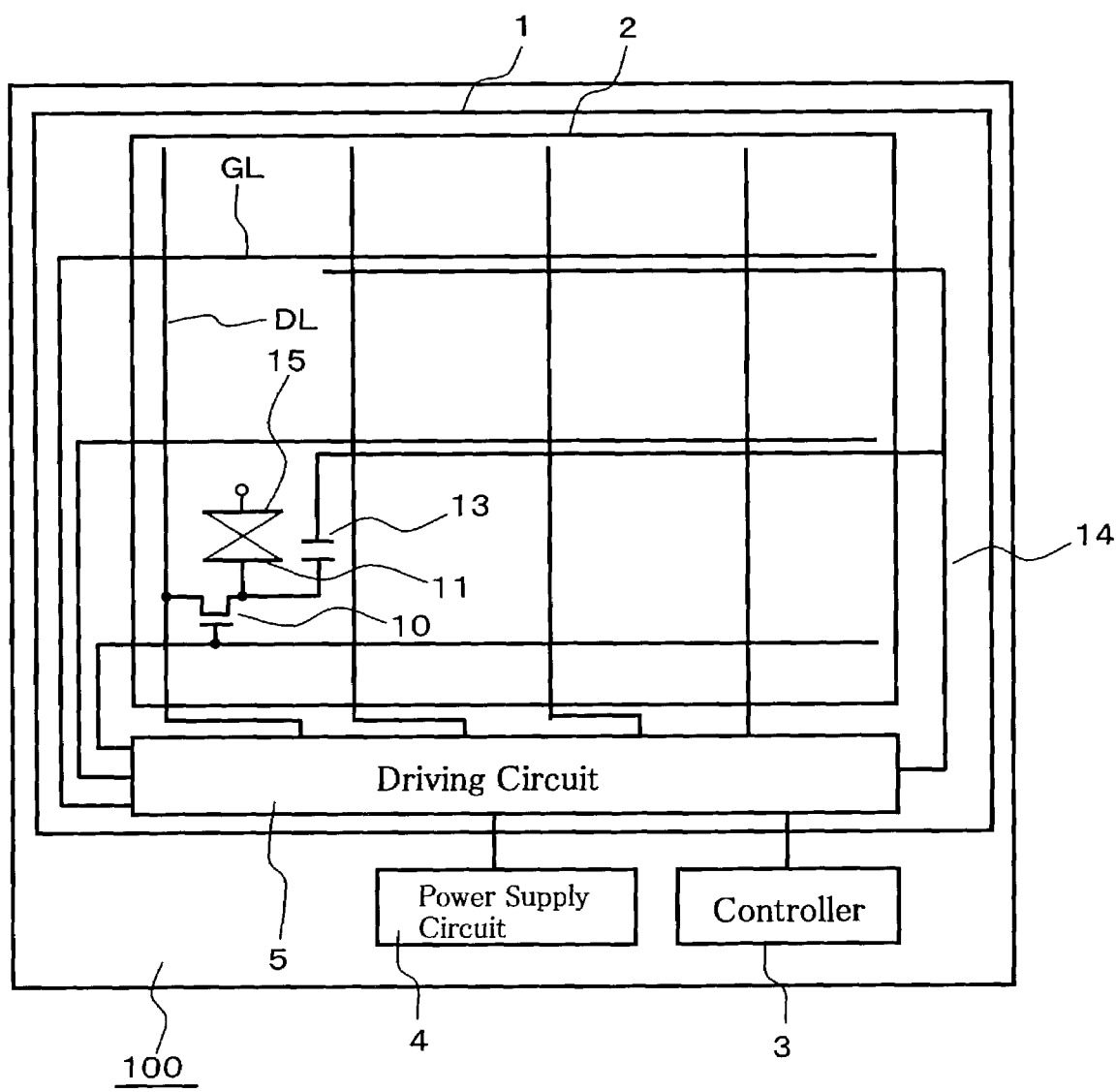
FIG. 1 is a schematic block diagram showing a liquid crystal display device of one embodiment of the present invention.

FIG. 1 is a block diagram showing the basic constitution of a liquid crystal display device of the present invention. As shown in the drawing, the liquid crystal display device 100 is constituted of a liquid crystal display panel 1, a controller 3, a power supply circuit 4 and a driving circuit 5.

The liquid crystal display panel 1 is constituted such that a TFT substrate 2 on which pixel electrodes 11, thin film transistors 10 and the like are formed and a filter substrate (not shown in the drawing) on which the counter electrodes 15, color filters and the like are formed are overlapped on each other with a specified gap therebetween, both substrates are laminated to each other using a sealing member which is mounted in a frame shape in the vicinity of the periphery of both substrates between the two, liquid crystal is filled between both substrates and within the periphery of the sealing member through a liquid crystal filling port formed in a portion of the sealing member and sealed, and polarizers are laminated to outsides of both substrates. Here, the present invention is applicable not only to a so-called horizontal field type liquid crystal display panel in which counter electrodes 15 are mounted on the TFT substrate 2 but also to a so-called vertical field type liquid crystal display panel in which counter electrodes 15 are formed on the filter substrate in the same manner.

Each pixel is constituted of a pixel electrode 11 and a thin film transistor 10 and is formed corresponding to a portion where a plurality of scanning signal lines (or gate signal lines) GL and a plurality of video signal lines (or drain signal lines) DL cross each other.

The thin film transistor 10 of each pixel has its source connected to the pixel electrode 11, its drain connected to the video signal line DL, and its gate connected to the scanning signal line GL. The thin film transistor 10 functions as a switch for supplying a display voltage (gray scale voltage) to the pixel electrode 11.

Although naming of "source" and "drain" may be reversed depending on the relationship of bias, a terminal which is connected to the video signal line DL is referred to as "drain" in this embodiment.

The controller 3, the power supply circuit 4 and the driving circuit 5 are respectively mounted on a transparent insulation substrate (glass substrate, resin substrate or the like) which constitutes the TFT substrate 2 of the liquid crystal display panel 1. Digital signals (display data, clock signals and the like) transmitted from the controller 3 and the power supply voltage supplied from the power supply circuit 4 are inputted to the driving circuit 5.

The controller 3 is constituted of semiconductor integrated circuits (LSI) and controls and drives the driving circuit 5 based on various display control signals such as clock signals, display timing signals, horizontal synchronous signals and vertical synchronous signals and display data (R/G/B) which are transmitted from the outside.

The driving circuit 5 is constituted of semiconductor integrated circuits (LSI) and performs driving of the scanning signal lines GL and driving of the video signal lines DL. Based on a frame start instruction signal (FLM, hereinafter referred to as "start signal") and a shift clock (CL1) transmitted from the controller 3, the driving circuit 5 supplies a selective scanning voltage (scanning signal) of "High" level to respective scanning signal lines GL of the liquid crystal display panel 1 sequentially with every succeeding horizontal scanning time period. Accordingly, the plurality of thin film transistors 10 which are connected to each scanning signal line GL of the liquid crystal display panel 1 become conductive for the time period of 1 horizontal scanning.

Further, the driving circuit 5 outputs a gray scale voltage which corresponds to a gray scale which the pixel is to display to the video signal line DL. When the thin film transistor 10 assumes an "ON" state, the gray scale voltage (video signal) is supplied to the pixel electrode 11 from the video signal line DL. Thereafter, when the thin film transistor 10 assumes an "OFF" state, the gray scale voltage based on an image which the pixel is to display is held by the pixel electrode 11.

Figure 2:
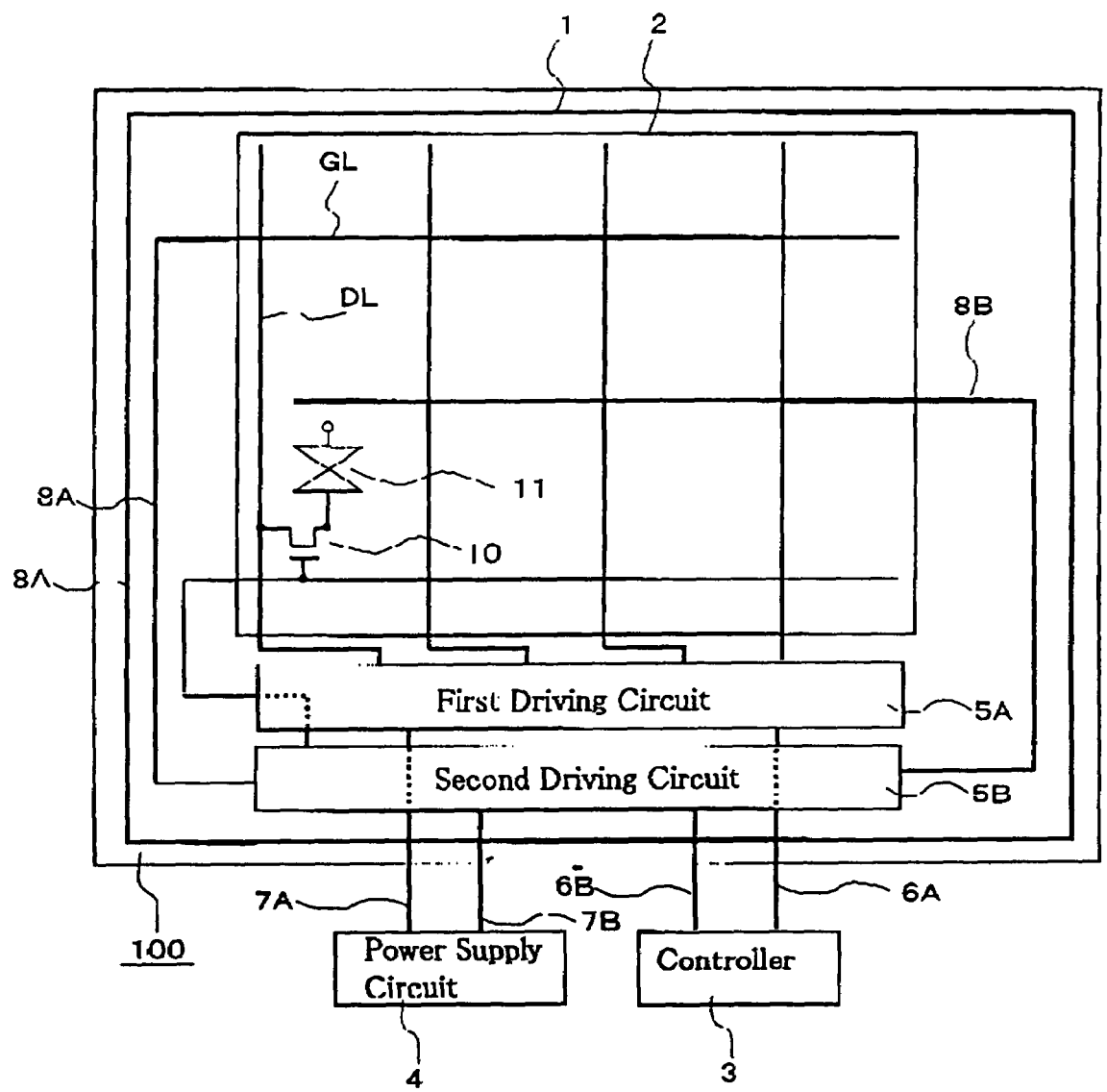
FIG. 2 is a schematic block diagram showing a liquid crystal display device of one embodiment of the present invention.

FIG. 2 shows an embodiment in which the driving circuit shown in FIG. 1 is divided into two driving circuits. That is, in FIG. 2, the driving circuit is constituted of a first driving circuit 5A and a second driving circuit 5B. The first driving circuit 5A supplies the gray scale voltage to the video signal lines DL. The second driving circuit 5B supplies the signals to the scanning signal lines GL. Lines extend from the second driving circuit 5B toward both sides, that is, left and right sides of the liquid crystal display panel 1 and the signals are supplied to the scanning signal lines GL from both sides, that is, left and right sides of the liquid crystal display panel 1.

Conventionally, a driving circuit for driving the scanning signal lines GL is provided on extension lines of the scanning signal lines GL (left or right side of the liquid crystal display panel 1 in the drawing). However, with respect to a portable electronic equipment such as a portable telephone set, due to reasons that a display screen portion has a narrow lateral width and a design of equipment which satisfies user's taste is requested, there has been a demand for a so-called centering of screen in which the center of the display screen is positioned on the center line of the equipment. Accordingly, there is no sufficiently wide region to allow the arrangement of the second driving circuit 5B at both lateral sides of the display screen and hence, the second driving circuit 5B is provided below (or above) the liquid crystal display panel 1 in the drawing. That is, the first driving circuit 5A and the second driving circuit 5B are formed such that these circuits are positioned on the same side of the liquid crystal display panel 1.

However, the arrangement of the first driving circuit 5A and the second driving circuit 5B at one side of the liquid crystal display panel 1 has given rise to a problem with respect to a layout of wiring or lines which are to be connected to respective driving circuits. In FIG. 2, since the second driving circuit 5B is positioned between the first driving circuit 5A and both the controller 3 and the power supply circuit 4, it is necessary to perform wiring around the second driving circuit 5B. For example, when the wiring is formed in a flexible board or the like, it is necessary to use an expensive multi-layered board. Further, when the first driving circuit 5A and the second driving circuit 5B are mounted on the liquid crystal display panel 1, the formation of the multi-layered wiring causes a problem that manufacturing steps of the liquid crystal display panel 1 are increased in number.

In FIG. 2, a first line 6A which connects the controller 3 and the first driving circuit 5A is arranged below the second driving circuit 5B. On the other hand, the controller 3 and the second driving circuit 5B are connected to each other by a second line 6B. Further, a third line 7A which connects the power supply circuit 4 and the first driving circuit 5A is arranged below the second driving circuit 5B and the power supply circuit 4 and the second driving circuit 5B are connected by a fourth line 7B.

Further, since the first driving circuit 5A is positioned between the second driving circuit 5B and the liquid crystal display panel 1, lines 8A, 8B which connect the second driving circuit 5B and the scanning signal lines GL are arranged to the sides of the first driving circuit 5A. Further, portions of the lines 8A, 8B are arranged below the first driving circuit 5A. Still further, lines outputted from the second driving circuit 5B are arranged such that the lines are outputted from both sides, that is, left and right sides of the second driving circuit 5B in the drawing.

Figure 3:
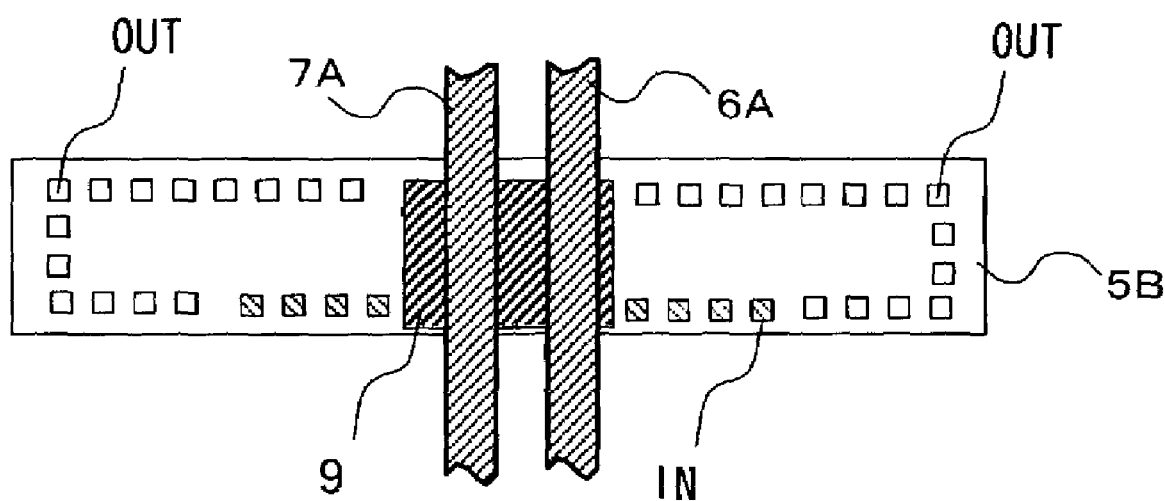
FIG. 3 is a schematic view showing an arrangement of terminals of a driving circuit used in a liquid crystal display device of one embodiment of the present invention.

FIG. 3 shows the arrangement of output terminals of the second driving circuit 5B. A through wiring region 9 which allows the arrangement of the first line 6A and the third line 7A shown in FIG. 2 is provided in a center portion of the second driving circuit 5B, whereby the interval between the output terminals OUT is broadened. Further, the output terminals OUT are arranged at left and right sides of the second driving circuit 5B. Terminals IN constitute input terminals to which the second lines 6B from the controller 3 and the fourth lines 7B from the power supply circuit 4 are connected. By providing the through wiring region 9 below the second driving circuit 5B, the through lines such as the first line 6A and the third line 7A which are arranged below the second driving circuit 5B can be formed on the same layer as the second line 6B which connects the second driving circuit 5B with the controller 3 and the fourth line 7B which connects the second driving circuit 5B with the power supply circuit 4. Accordingly, the reduction of the manufacturing cost of the liquid crystal display device and the centering of screen can be realized.

Figure 4:
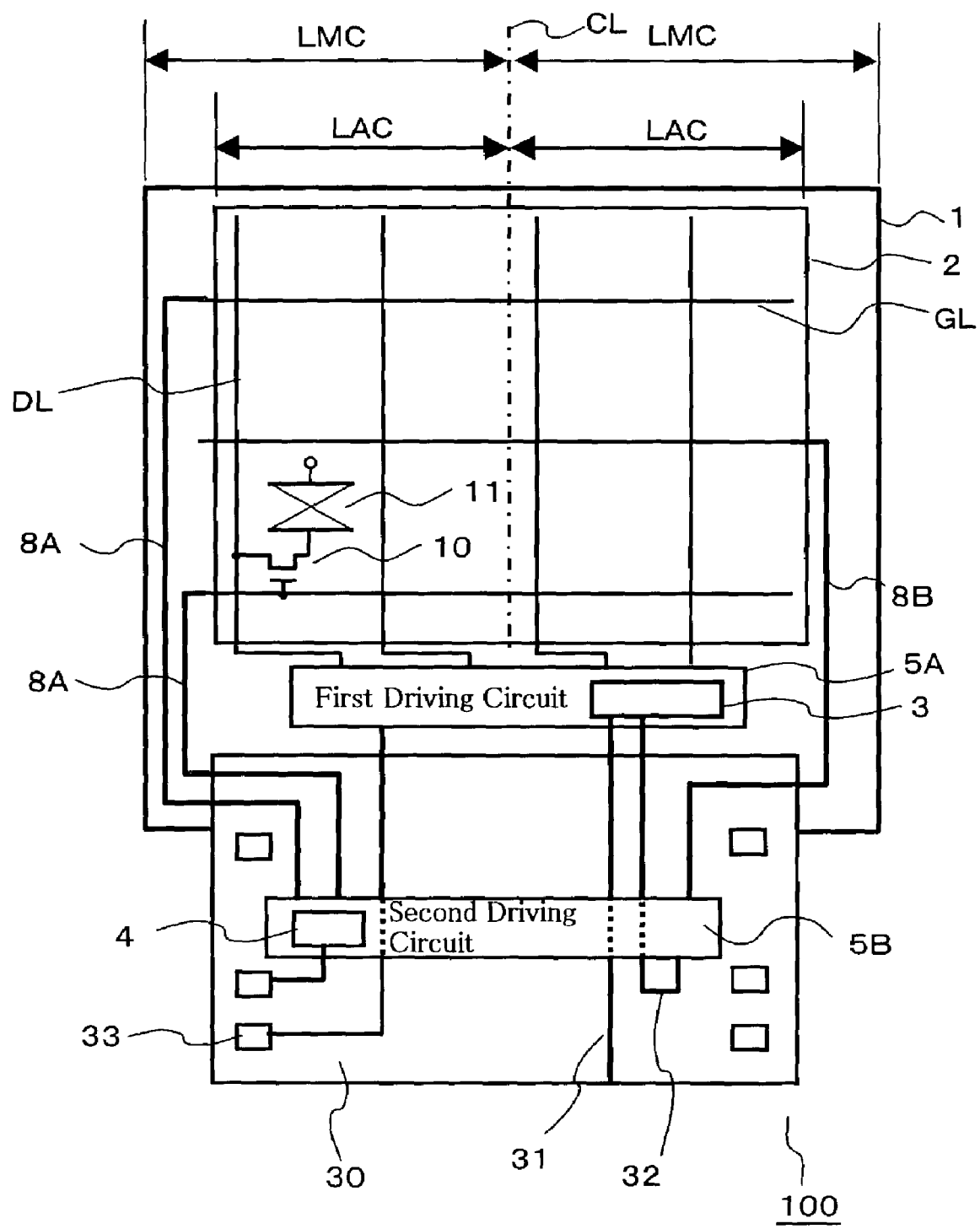
FIG. 4 is a schematic block diagram showing a liquid crystal display device of one embodiment of the present invention.

FIG. 4 shows the constitution of the liquid crystal display device 100 in which the second driving circuit 5B is mounted on a flexible printed circuit board 30 and the flexible printed circuit board 30 is connected to a side of the liquid crystal display panel 1 on which the first driving circuit 5A is mounted. The center line of the liquid crystal display device 100 is aligned with the center line of the display region 2. That is, the center line CL which is arranged equidistantly from left and right edges of the liquid crystal display device 100 by a distance LMC is aligned with the center line CL which is arranged equidistantly from left and right edges of the display region 2 by a distance LAC.

In FIG. 4, numeral 33 indicates a part such as an externally mounted capacitor or the like which is mounted on the flexible printed circuit board 30. The power supply circuit 4 is incorporated into the second driving circuit 5B and a capacitor which is used as a booster circuit is connected to the second driving circuit 5B. The controller 3 is incorporated into the first driving circuit 5A. A line 31 which is connected to the controller 3 from the outside is mounted on the flexible printed circuit board 30 and is connected to the first driving circuit 5A after passing below the second driving circuit 5B. A control signal line 32 for controlling the second driving circuit 5B and the power supply circuit 4 is outputted from the first driving circuit 5A and is connected to the second driving circuit 5B. The control signal line 32 is also arranged below the second driving circuit 5B.

Figure 5:
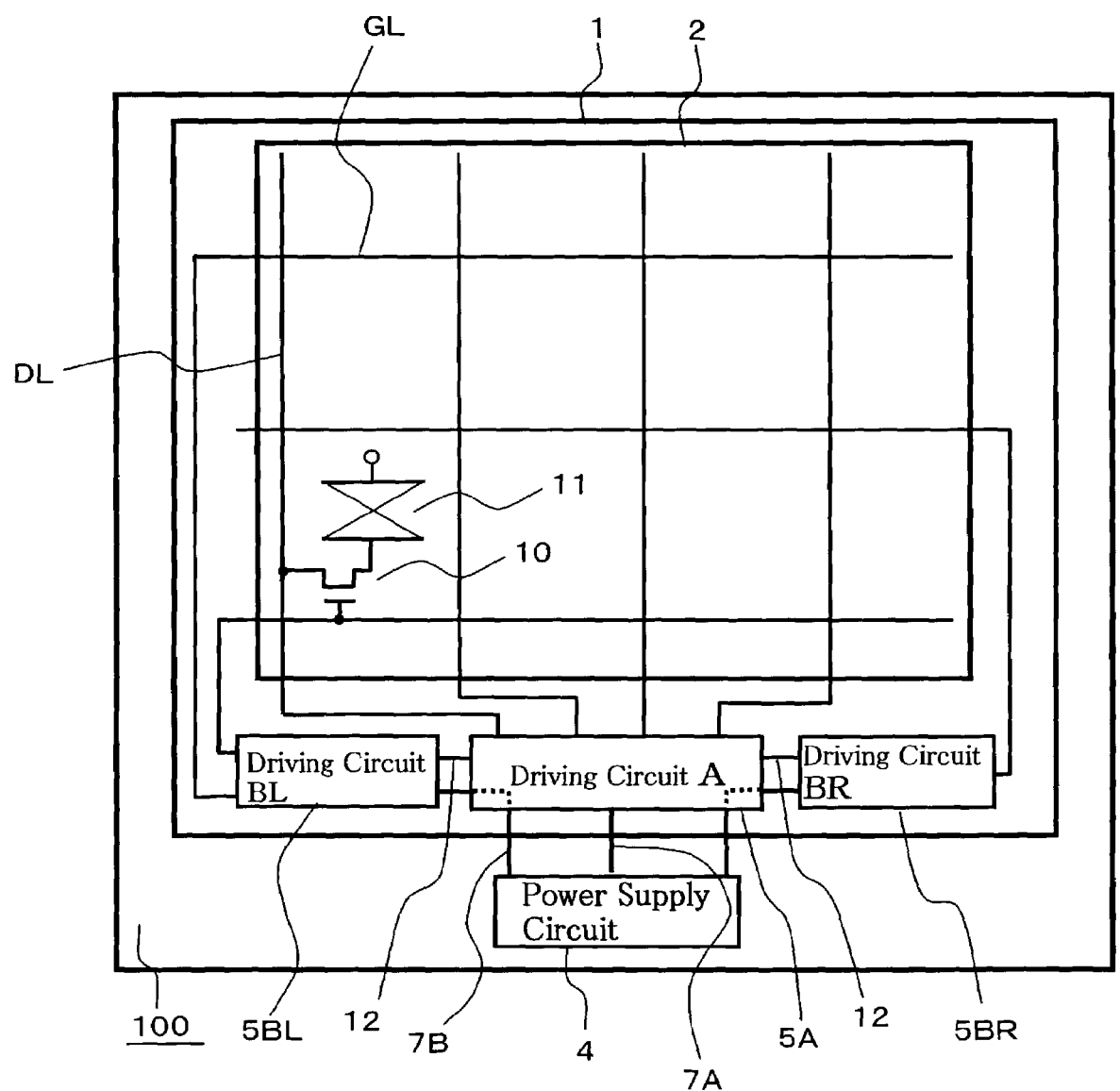
FIG. 5 is a schematic block diagram showing a liquid crystal display device of one embodiment of the present invention.

Subsequently, FIG. 5 shows a block diagram in which the second driving circuits 5B are formed in plural and are arranged at both sides, that is, left and right sides of the first driving circuit 5A. To supply the signals to the scanning signal line GL from both sides, that is, left and right sides of the liquid crystal display panel 1, the second driving circuits 5B are arranged at left and right sides of the first driving circuit 5A. The first driving circuit 5A has a function of controller in addition to a function of drain driver for driving the video signal lines DL. A line 7A is provided between the first driving circuit 5A and the power supply circuit 4 and a power supply voltage is supplied to the first driving circuit 5A. Further, the first driving circuit 5A also controls the power supply circuit 4, transmitting control signals through the line 7A. Further, there are provided lines 7B which are arranged below the first driving circuit 5A and are connected to the second driving circuits 5B. Numerals 12 indicate instruction lines which allow the setting of scanning method of the second driving circuits 5B in response to signals from the outside. In FIG. 5, the instruction signals are outputted from the first driving circuit 5A and are transmitted to the second driving circuits 5B.

The second driving circuits 5B are arranged at left and right sides of the first driving circuit 5A. However, when these second driving circuits 5B are manufactured separately such that one second driving circuit 5B is for left-side use and the other second driving circuit 5B is for right-side use, parts similar in shape or the like are mingled so that there arises a problem that the handling of parts becomes complicated. Accordingly, the second driving circuits 5B which are mounted in plural are made with the same specifications, and the second driving circuits 5B are controlled by signals which are inputted to the terminal after mounting through the instruction lines 12 or the like. Further, since a plurality of second driving circuits 5BL, 5BR are formed using the same specification, the second driving circuits 5BL, 5BR are configured such that same signals are inputted to both circuits with respect to control signals, clock signals and the like.

Figure 6A:
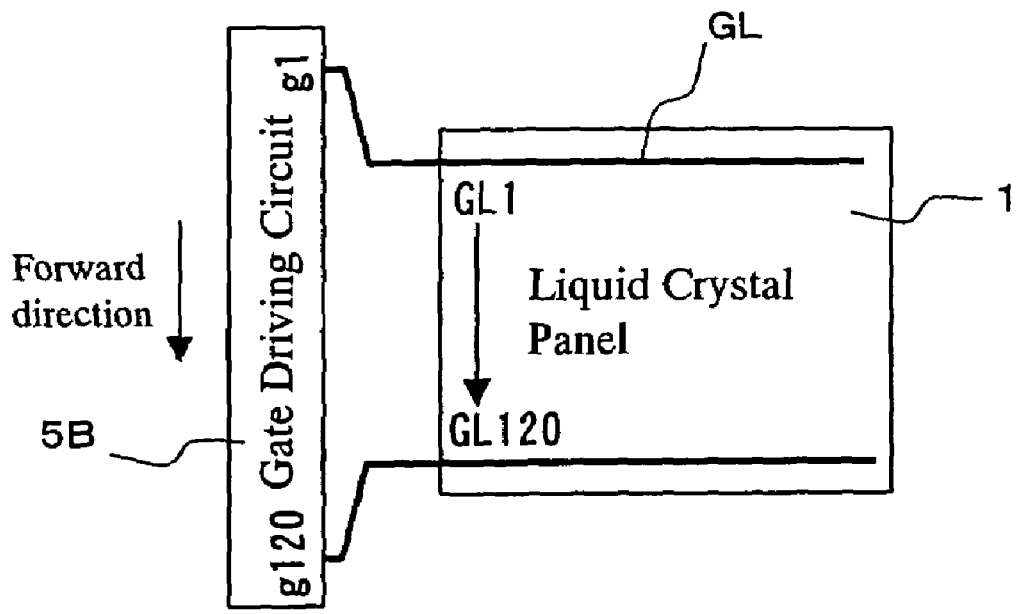
FIG. 6 is a schematic view explaining the arrangement of a driving circuit and the scanning direction of a liquid crystal display device of one embodiment of the present invention.
Figure 6B:
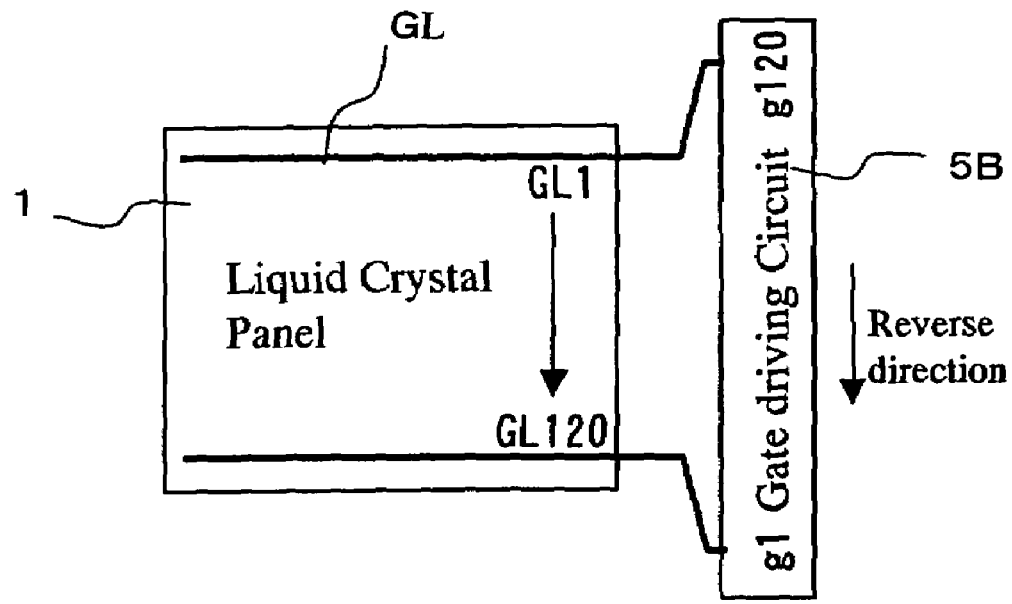
Figures 7, 8:
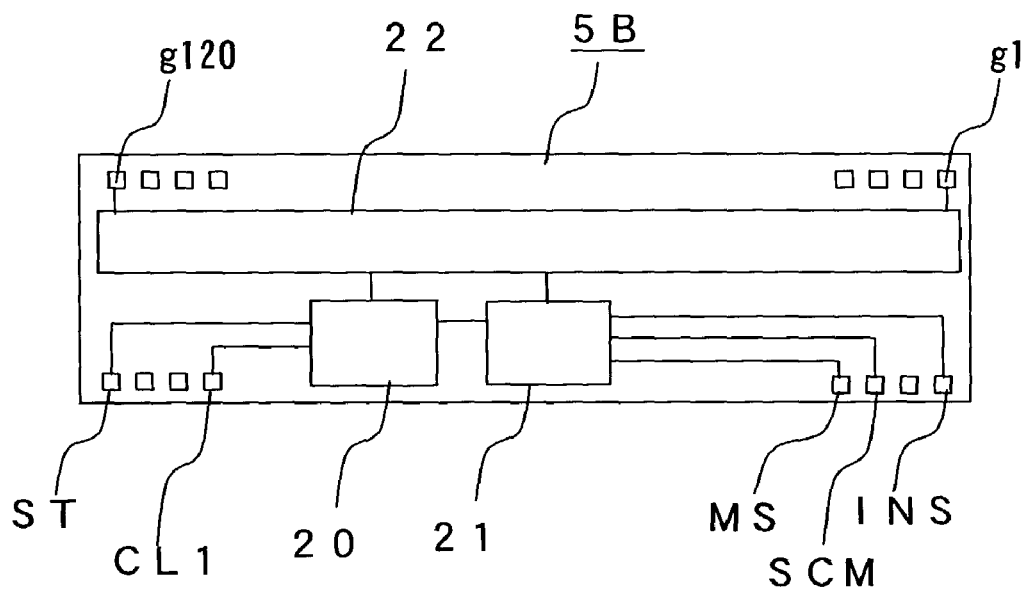
FIG. 7 is a schematic block diagram showing the arrangement of terminals and the inner constitution of a driving circuit used in a liquid crystal display device of one embodiment of the present invention.
FIG. 8 is a schematic view showing instruction signals used in a liquid crystal display device of one embodiment of the present invention.

First of all, since the positions of terminals of the driving circuit are fixed, the driving circuit arranged at the left side of the liquid crystal display panel 1 and the driving circuit arranged at the right side of the liquid crystal display panel 1 differ in the sequence of outputting from their terminals, as will here be explained using FIG. 6 and FIG. 7. FIG. 6(a) shows a conventional arrangement of a gate driver, wherein the second driving circuit 5B (gate driver) is arranged at the left side of the liquid crystal display panel 1. Here, it is assumed that 120 scanning signal lines indicated by GL1 to GL120 are provided and the scanning signals are sequentially supplied to the scanning signal lines GL in the descending order from the top to the bottom of the liquid crystal display panel 1. In FIG. 6(a), a terminal g1 of the second driving circuit 5B and the scanning signal line GL1 are connected to each other and the scanning signal is sequentially outputted in the order from the terminal g1 to the terminal g120 such that the scanning signals are supplied to the scanning signal line GL1 to GL120 in this order. To facilitate the understanding, the outputting of scanning signal in the order from the terminal g1 to the terminal g120 is referred to as "normal direction outputting".

Subsequently, FIG. 6(b) shows the state in which the second driving circuit 5B is arranged at the right side of the liquid crystal display panel 1. As shown in FIG. 7, the arrangement of terminals of the second driving circuit 5B is set such that output terminals g1 to g120 are arranged along respective sides of the second driving circuit 5B and lines are taken in one direction. In FIG. 7, the terminal g1 is arranged such that a line thereof is outputted at the upper side. This is because that when the line is outputted at the lower side, due to the presence of an input terminal INS and the like at the lower side, a region in which the line is formed is limited and hence, it is difficult to form the line.

Accordingly, when the second driving circuit 5B is arranged at the right side of the liquid crystal display panel 1, a line from the terminal g120 is connected to the scanning signal line GL1 and the signal is transmitted from the terminal g1 to the scanning signal line GL120. Accordingly, the order of outputting the scanning signal is determined such that the scanning signals are sequentially outputted in the descending order of the terminal g120 to the terminal g1. That is, the second driving circuits 5B change the shift direction of the signals sequentially outputted from the terminals based on the arrangement with respect to the liquid crystal display panel 1. Hereinafter, the outputting of scanning signal in the order from the terminal g120 to the terminal g1 so as to scan the scanning lines is referred to as "reverse direction outputting".

Now returning to FIG. 5, drawbacks which arise when the second driving circuits 5B are provided in a plural numbers and are arranged at both sides, that is, left and right sides of the first driving circuit 5A are explained. The second driving circuit 5BL shown in FIG. 5 is arranged so as to supply the signal from the left side of the liquid crystal display panel 1 and the second driving circuit 5BR shown in FIG. 5 is arranged so as to supply the signal from the right side of the liquid crystal display panel 1. As mentioned previously, the second driving circuit 5BL adopts the normal direction outputting and the second driving circuit 5BR adopts the reverse direction outputting and hence, these circuits are opposite from each other with respect to the order of signals outputted from the terminals. Accordingly, it is necessary to set the second driving circuit 5BL to output in the normal direction outputting and the second driving circuit 5BR to output in the reverse direction.

Further, the second driving circuit 5BL and the second driving circuit 5BR are arranged apart from each other and the first driving circuit 5A is between the second driving circuits 5BL, 5BR. Accordingly, the provision of a line which connects between the second driving circuits 5BL, 5BR gives rise to a problem that the layout of wiring becomes complicated. For example, when two second driving circuits 5BL, 5BR are arranged next to each other, first of all, a start signal is inputted to the left-side second driving circuit 5BL so as to make the second driving circuit 5BL output first and, thereafter, at the time of completion of outputting, a start signal is supplied from the left-side second driving circuit 5BL to the right-side second driving circuit 5BR. In this manner, when two second driving circuits 5BL, 5BR are arranged next to each other, it is possible to set the order such that the left-side second driving circuit 5BL starts outputting first and, thereafter, the right-side second driving circuit 5BR starts outputting.

However, when the line which connects between the second driving circuits 5BL, 5BR is provided, the layout of wiring becomes complicated and hence, it is difficult to adopt the method in which by supplying the signal from the second driving circuit of preceding stage to the second driving circuit of succeeding stage, the outputting of the second driving circuit of the succeeding stage is started. Further, when inputting the same control signal using the same layout of wiring with respect to both of the second driving circuits 5BL, 5BR, it is necessary to set the order of output between these two driving circuits. Hereinafter, to output first is referred to as "initial start" and to output after the completion of output by the initial start driving circuit is referred to as "later start".

Accordingly, in this embodiment, by setting terminals provided to the second driving terminals and by using the instruction lines 12 connected from the first driving circuit to the second driving circuits, the scanning method of the second driving circuits is set as to whether they adopt the normal direction outputting or the reverse direction outputting, and whether it is initial start or later start.

Next, the constitution for setting the scanning method of the second driving circuit 5B is explained in conjunction with FIG. 7. As described previously, the second driving circuit 5B includes output terminals g1 to g120 and these output terminals are connected with the scanning signal lines GL of the liquid crystal display panel 1. The scanning signals are outputted from the output terminals every scanning period such that the scanning signal lines GL are selected sequentially. For this end, the second driving circuit 5B is provided with a shift register 22. The shift register 22 shifts the terminal from which the scanning signal is outputted in synchronism with a clock signal CL1 inputted from the terminal CL1.

ST indicates terminals to which the start signal (frame start signal) is inputted, and the second driving circuit 5B determines the timing of starting the outputting in response to the start signal. MS indicates a terminal which sets a master/slave mode, wherein the second driving circuit 5B is set to a master function mode or a slave function mode based on a value of the terminal MS. INS indicates an instruction signal terminal to which the instruction signal is inputted. SCM indicates a terminal which sets lines to which the second driving circuit 5B outputs to be either the odd lines or the even lines of the liquid crystal display panel 1.

Numeral 20 indicates a counter circuit which counts the number of clock signals CL1. Numeral 21 indicates a scanning mode setting portion which sets the voltage value inputted to the terminal MS and the terminal SCM and sets the scanning mode in response to the instruction signals inputted from the terminal INS.

FIG. 8 shows an example of the instruction signals. The instruction signals shown in FIG. 8 are constituted of serial data of 16 bits. The signal of 16 bits arranged in the lateral direction in the drawing is transmitted to the second driving circuit 5B from the outside as an instruction signal. Although three instruction signals are arranged in the vertical direction in FIG. 8, the three bits ranging from D15 to D13 constitute index codes and these codes classify the content of the instruction signals.

If the instruction signal is the index code (000), D0 constitutes a SLP bit for setting a sleep mode and D11 constitutes a GON bit for setting a display ON/OFF. If the instruction signal is the index code (110), the 5 bits from D0 to D4 become the SC0 bit to SC4 bit which set the output starting position, and the 5 bits from D5 to D9 become the NL0 bit to NL4 bit which set the number of effective lines and D10 becomes the GS bit which sets whether the outputting direction is the normal direction or the reverse direction with respect to the D10. If the instruction signal is the index code (111), 2 bits consisting of D0 and D1 become FL bits which set the number of field of an interlace mode.

Here, with respect to the output starting position and the number of effective lines which are designated by the instruction signals, it is possible to designate the number of scanning signal lines or it is possible to designate the number of output lines based on a mode such as a 110 line output mode, a 100 line output mode or the like. Further, although the instruction signals are transmitted from the controller part to the second driving circuit 5B, the instruction signals are transmitted to the controller part separate from the liquid crystal display device, for example a CPU controlling a small portable device.

Next, the arrangement of the second driving method 5B and the manner of scanning are explained in conjunction with FIG. 9 to FIG. 14. In FIG. 9 to FIG. 14, to show the positional relationship between the liquid crystal display panel 1 and the second driving circuit 5B, the constitution of the first driving circuit 5A which constitutes the other driving circuit is omitted. With respect to the arrangement of the second driving circuit 5B shown in FIG. 9 to FIG. 14, as shown in FIG. 7, each second driving circuit 5B includes the master/slave terminal MS which changes the function of the second driving circuit 5B to a master mode or a slave mode in response to the signal from the outside. In FIG. 9, the second driving circuit 5BL arranged at the left side assumes a master mode and the second driving circuit 5BR arranged at the right side assumes a slave mode. Further, in the second driving circuit 5B, the instruction lines 12 shown in FIG. 5 are connected to the instruction terminal INS shown in FIG. 7 so that the instruction signals are inputted to the second driving circuit 5B.

Table 1 shows the scanning method of the second driving circuit 5B which is controlled based on the value of the master/slave terminal MS and the values of instruction signals. Here, as shown in FIG. 8, the instruction signals are data constituted of a plurality of bits and the scanning method is set in accordance with the 1 bit indicated by symbol GS. In Table 1, a case in which the second driving circuit 5B assumes the master mode when the value of terminal MS is 1 and assumes the slave mode when the value of terminal MS is 0 is explained. In the master mode, the scanning direction is the normal direction when GS bit is 0 and is the reverse direction when GS bit is 1. On the other hand, in the slave mode, the scanning direction is the reverse direction when GS bit is 0 in the slave mode and is the normal direction when GS bit is 1 in the master mode.

TABLE 1

| MS | GS | sequence of starting | scanning direction |
|---|---|---|---|
| 1 | 1 | initial start | reverse direction |
| 1 | 0 | initial start | normal direction |
| 0 | 1 | later start | normal direction |
| 0 | 0 | later start | reverse direction |

In FIG. 9, with respect to the setting of the second driving circuit 5BL arranged at the left side in the drawing, the value of the master/slave terminal MS and the scanning method are set to MS=1 and GS=0. The sequence of starting is the initial start and the scanning direction is the normal direction. The output terminal gm1 is connected to the scanning signal line GL1 and other terminals are also sequentially connected to the scanning signal lines, and the output terminal gm120 is connected to the scanning signal line GL120. When the number of effective lines is set to 120 and the starting position is set to 1st line based on the instruction signals, since the second driving circuit 5BL is set to the initial start and the normal direction output, the output is started after input of the start signal and the scanning is performed sequentially from the scanning signal line GL1 to the scanning signal line GL120. Here, if the starting position is set to 11th line and the number of effective lines is 110, the scanning is performed from the 11th scanning signal line GL11 to the scanning signal line GL120.

Then, with respect to the setting of the second driving circuit 5BR arranged at the right side in the drawing, the value of the master/slave terminal MS and the scanning method GS are set to MS=0 and GS=0 respectively. The sequence of starting is the later start and the scanning direction is the reverse direction. The output terminal gs120 is connected to the scanning signal line GL121 and other terminals are also sequentially connected to the scanning signal lines, and the output terminal gs1 is connected to the scanning signal line GL240. When the number of effective line is set to 120 and the starting position is set to 1st line based on the instruction signals, since the second driving circuit 5BR is set to the later start and the reverse direction outputting, the clock signals CL1 are counted by the counter 20 shown in FIG. 7 from the inputting of the start signal and, upon completion of the output of the second driving circuit 5BL, the scanning is sequentially performed from the scanning signal line GL121 to the scanning signal line GL240. Here, with respect to the instruction signals, since the same instruction signals are inputted to the second driving circuit 5BL and the second driving circuit 5BR, when the starting position set by the instruction signals is the 11th line and the number of effective lines set by the instruction signals is 110 and the mode is set to the slave mode, the scanning is performed sequentially from the 121th scanning signal line GL121 to the scanning signal line GL230.

Figure 9A:
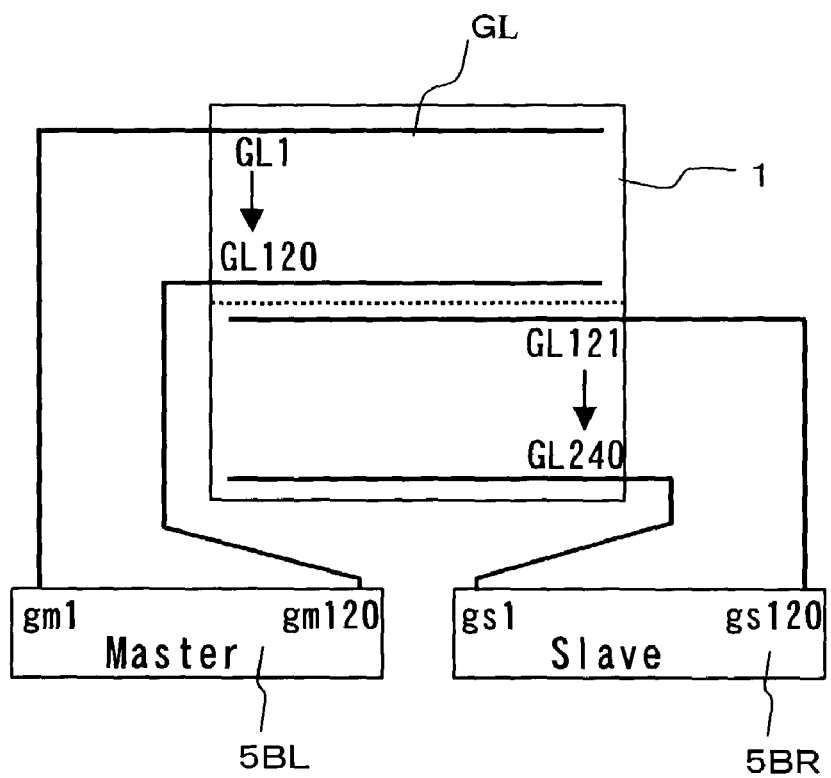
FIG. 9 is a schematic block diagram showing the positional relationship between a driving circuit and a liquid crystal display panel of a liquid crystal display device of one embodiment of the present invention.
Figure 9B:
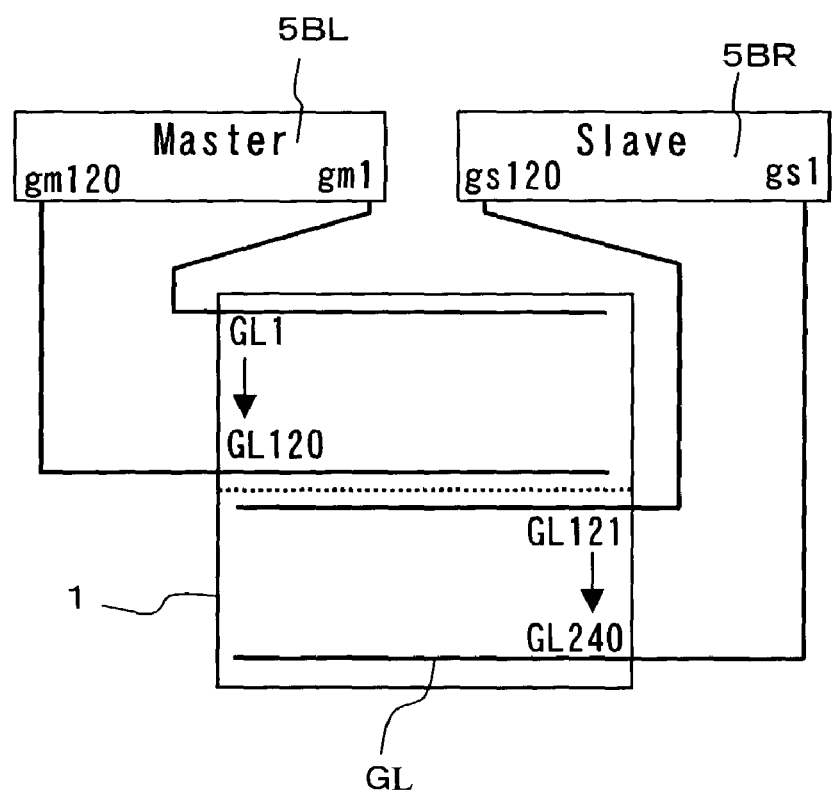

Here, FIG. 9(a) shows a case in which the second driving circuit 5B is arranged at the lower side of the liquid crystal display panel 1 and FIG. 9(b) shows a case in which the second driving circuit 5B is arranged at the upper side of the liquid crystal display panel 1.

Here, the relationship between the output start position and the number of effective lines when the number of effective lines is designated based on the mode is explained in conjunction with FIG. 9. Assume that the number of effective lines is 120 in the mode 0 and the number of effective lines is 110 in the mode 1, for example. In the mode 0, as described previously, at the second driving circuit 5BL which constitutes the master side (hereinafter referred to as "master"), the output is started from the terminal gm1 and the output is completed when 120 effective lines are outputted. Subsequently, the second driving circuit 5BR which constitutes the slave side (hereinafter referred to as "slave") counts the clock signals CL1 using the counter and starts the outputting from the terminal gs120 following the completion of the outputting by the master.

Subsequently, in the mode 1 in which the number of effective lines is 110, the master outputs 110 scanning signals. However, when the master outputs the scanning signal from the terminal gm1, the outputting is completed at the terminal gm110 and hence, the image in scanning signal lines GL111 to GL120 is generated but is not displayed on the display screen. Accordingly, the terminal gm11 is designated as the output start position. Here, once the number of effective lines is determined, the necessary outputting start position is also determined, so that the designation of the outputting start position seems to be unnecessary. However, one possible method for mounting the second driving circuit 5B is the connection in which the number of effective lines is set to 110, the terminal gm9 is designated as the outputting start terminal and the terminal gm119 and the terminal gm120 are not connected to the scanning signal line GL. Accordingly, the setting of the outputting start position is also necessary.

Subsequently, in the mode 1, even in the case that the number of effective lines is 110 and the outputting start position is the 11th line, the slave is operated to start the outputting from the terminal gs120 and to complete the outputting at the terminal gs11. Further, with respect to the slave in the mode 1, when the outputting start position is designated to be the 9th line, based on the understanding that the master and the slave of the second scanning circuit 5B are mounted symmetrically and where it is decided that the terminal gs119 and the terminal gs120 are not to be connected to the scanning signal line GL, the terminal gs118 is set as the output start position and the output is completed at the terminal gs9.

Figure 10:
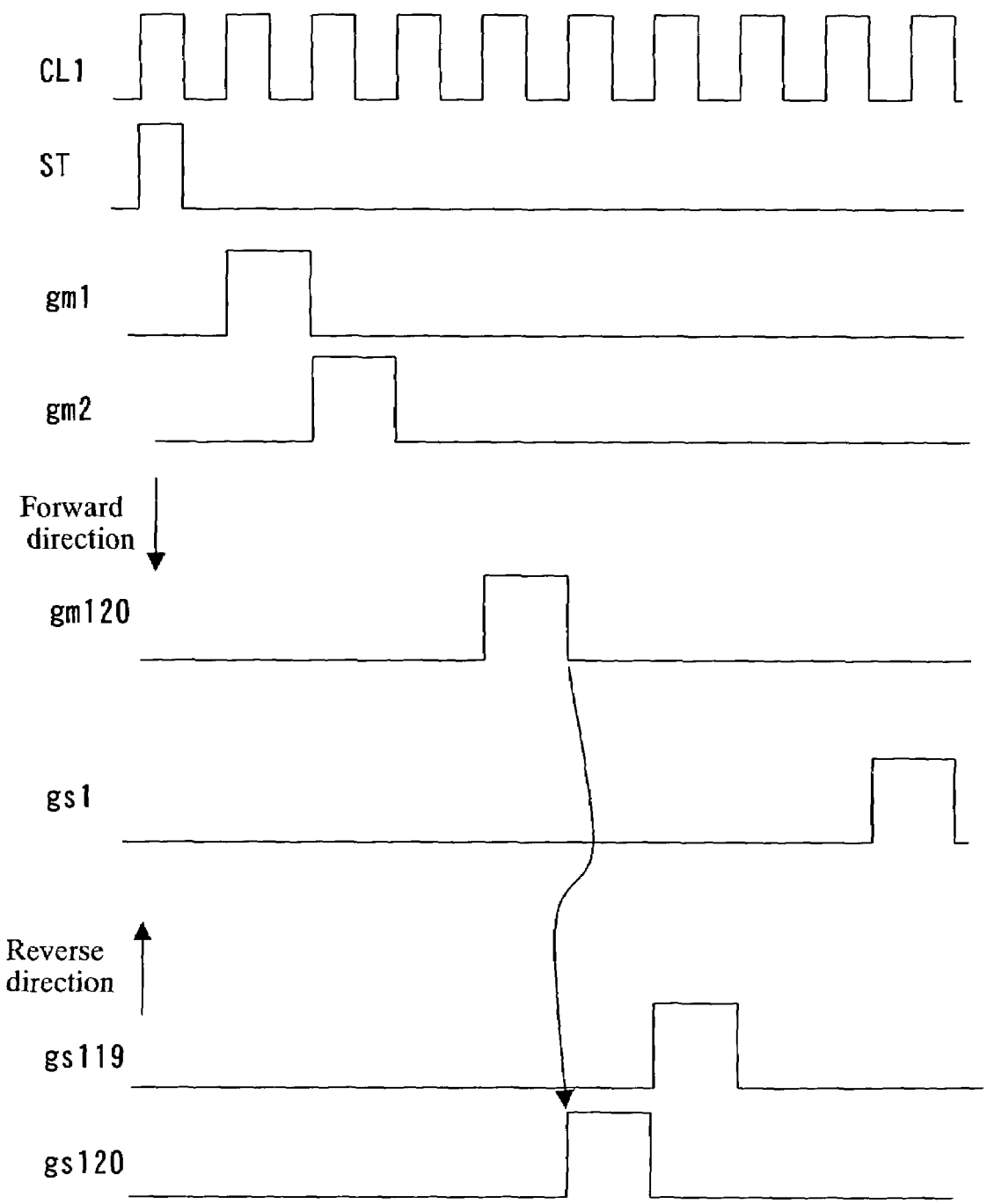
FIG. 10 is a timing chart showing a driving method of the liquid crystal display device shown in FIG. 9.

FIG. 10 shows the timing of operation of the second driving circuit 5B shown in FIG. 9. As described above, CL1 indicates the clock signals which are inputted to the second driving circuit 5B. In synchronism with the clock signals CL1, the signal of a shift register in the second driving circuit 5B is shifted so that the scanning signals are outputted sequentially. ST indicates the start signal and the shift register starts shifting of the signals in response to the start signal. However, the driving circuit which starts the shifting in response to the start signal ST is the second driving circuit 5B which is set to the master mode by the terminal MS. In FIG. 9, the second driving circuit 5BL is set to the master mode and starts the shifting in response to the start signal.

gm1 to gm120 indicate the output terminals of the second driving circuit 5BL. In FIG. 9, with respect to the second driving circuit 5BL, since the GS bit included in the instruction signals is set to 0 so that the normal direction output is adopted, the second driving circuit 5BL outputs the scanning signal from the output terminal gm1 first of all. Subsequently, in synchronism with the clock signal CL1, the second driving circuit 5BL outputs the scanning signal from the output terminal gm2 and succeeding output terminals until the scanning signal is outputted from the terminal gm120.

gs1 to gs120 indicate the output terminals of the second driving circuit 5BR. The second driving circuit 5BR which is set to the slave mode outputs the scanning signals after completion of outputting by the second driving circuit 5BL. As described above, with respect to the second driving circuit 5BR, the number of effective scanning lines is set in response to the instruction signals and the second driving circuit 5BR counts the clock signals CL1 using the counter circuit 20. After counting effective scanning lines 120 from a point of time that the start signal ST is outputted, the second driving circuit 5BR starts the outputting of scanning signals. Since the GS bit of the instruction signals inputted to the second driving circuit 5BR is 0, the second driving circuit 5BR assumes the reverse direction outputting and hence, the outputting of the scanning signals is started from the terminal gs120. Thereafter, the scanning signal is outputted from the terminal gs119 through succeeding scanning signals sequentially performed until the scanning signal is outputted from the terminal gs1.

Figure 11A:
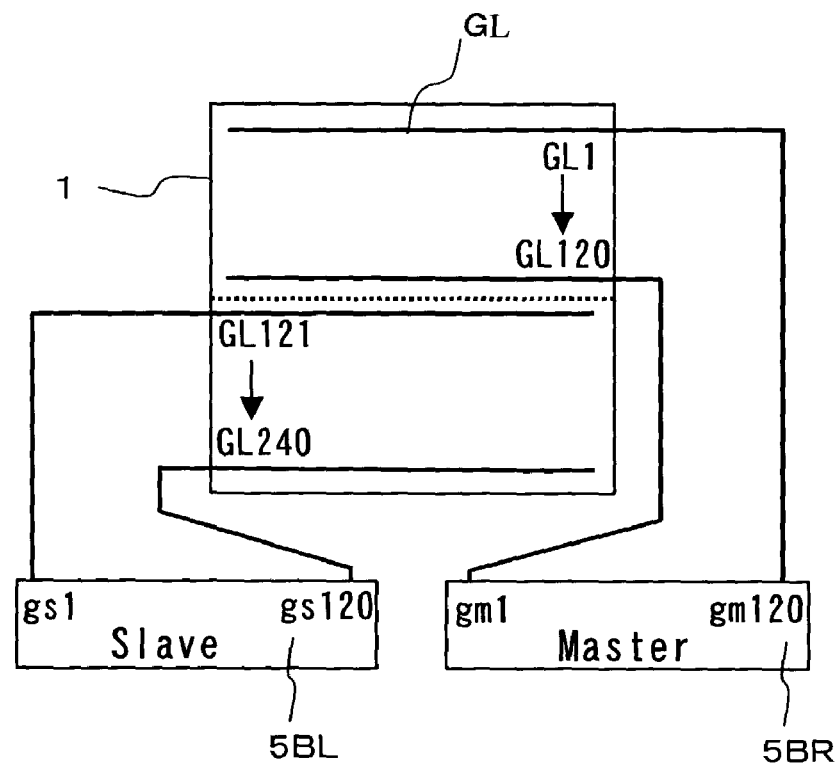
FIG. 11 is a schematic block diagram showing the positional relationship between a driving circuit and a liquid crystal display panel of a liquid crystal display device of one embodiment of the present invention.
Figure 11B:
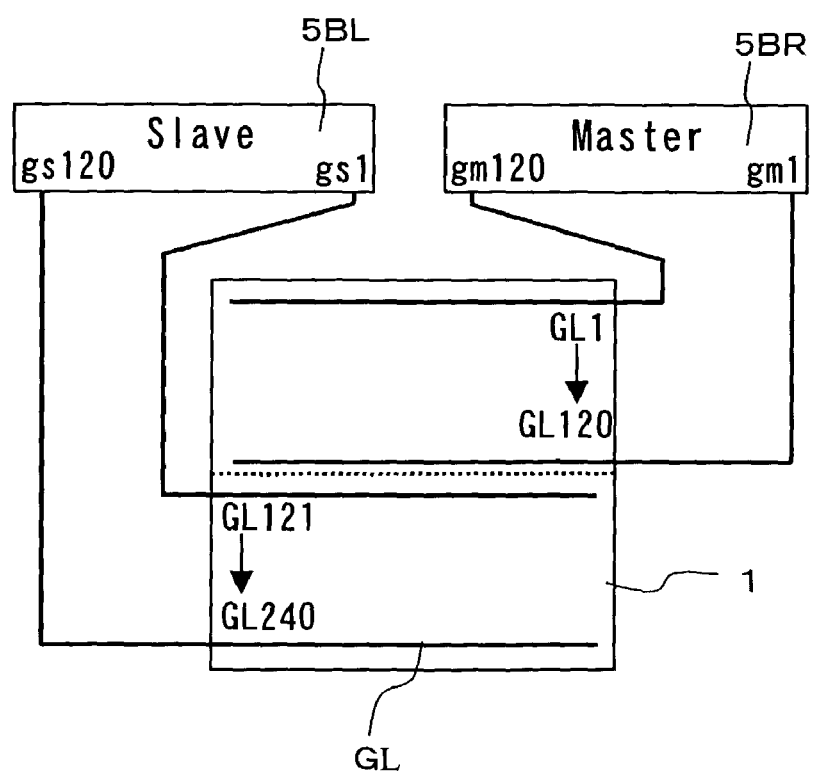

Next, another embodiment shown in FIG. 11 is explained. In FIG. 11, with respect to the setting of the second driving circuit 5BL arranged at the left side in the drawing, the value of the master/slave terminal MS and the scanning method are set to MS=0 and GS=1 respectively. The sequence of starting is the later start and the scanning direction is the normal direction. On the other hand, with respect to the setting of the second driving circuit 5BR arranged at the right side in the drawing, the value of the master/slave terminal MS and the scanning method are set to MS=1 and GS=1 respectively. The sequence of starting is the initial start and the scanning direction is the reverse direction. Here, FIG. 11(a) shows a case in which the second driving circuits 5B are arranged at the lower side of the liquid crystal display panel 1 and FIG. 11(b) shows a case in which the second driving circuits 5B are arranged at the upper side of the liquid crystal display panel 1.

Next, a case in which the scanning signal lines are driven in a state that the scanning signal lines are divided into the odd-numbered scanning signal lines and the even-numbered scanning signal lines shall be explained in conjunction with FIG. 12. In the scanning method shown in FIG. 12, by suitably setting the value of the terminal SCM, the second driving circuits 5B are set to an odd/even line output mode. In the odd/even line outputting mode, the master which performs the initial start in response to the start signal ST drives the odd-numbered scanning signal lines and the slave which performs the later start drives the even-numbered scanning signal lines.

In FIG. 12, the second driving circuit 5BL at the left side in the drawing is set as the master, wherein the value of the GS bit of the instruction signals is set to 0 so that the sequence of starting is the initial start and the scanning direction is the normal direction. The second driving circuit 5BR at the right side in the drawing is set as the slave, wherein the value of the GS bit of the instruction signals is set to 0 so that the sequence of starting is the later start and the scanning direction is the reverse direction. However, in the odd/even line outputting mode, the slave starts the outputting from the 2nd count of the clock signal CL and the master and the slave alternate output of the scanning signals every count of the clock signal CL1.

Figure 12A:
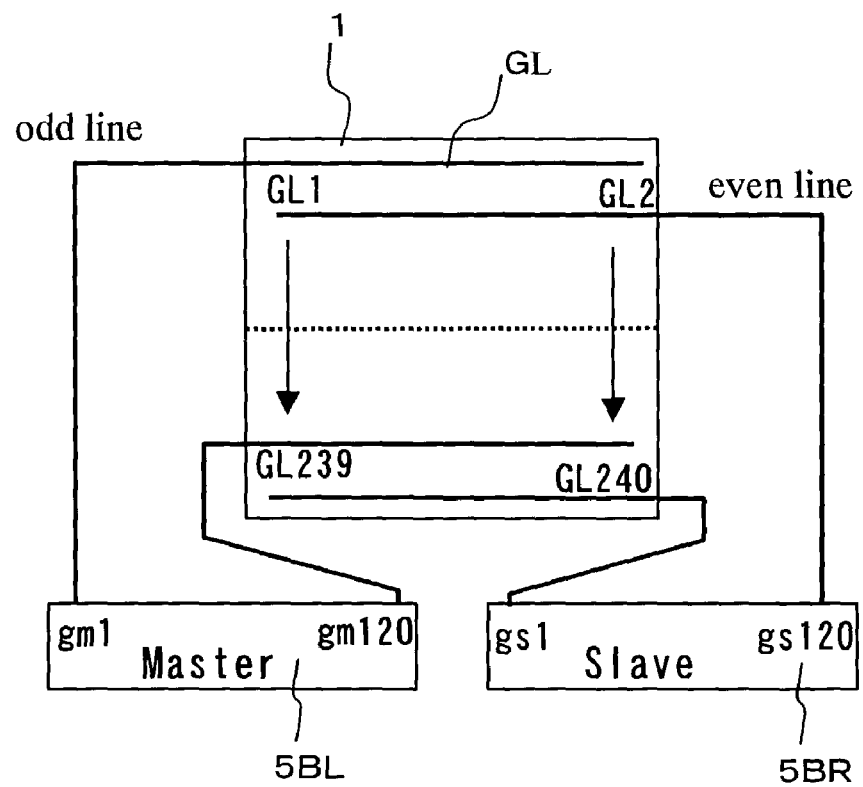
FIG. 12 is a schematic block diagram showing the positional relationship between a driving circuit and a liquid crystal display panel of a liquid crystal display device of one embodiment of the present invention.
Figure 12B:
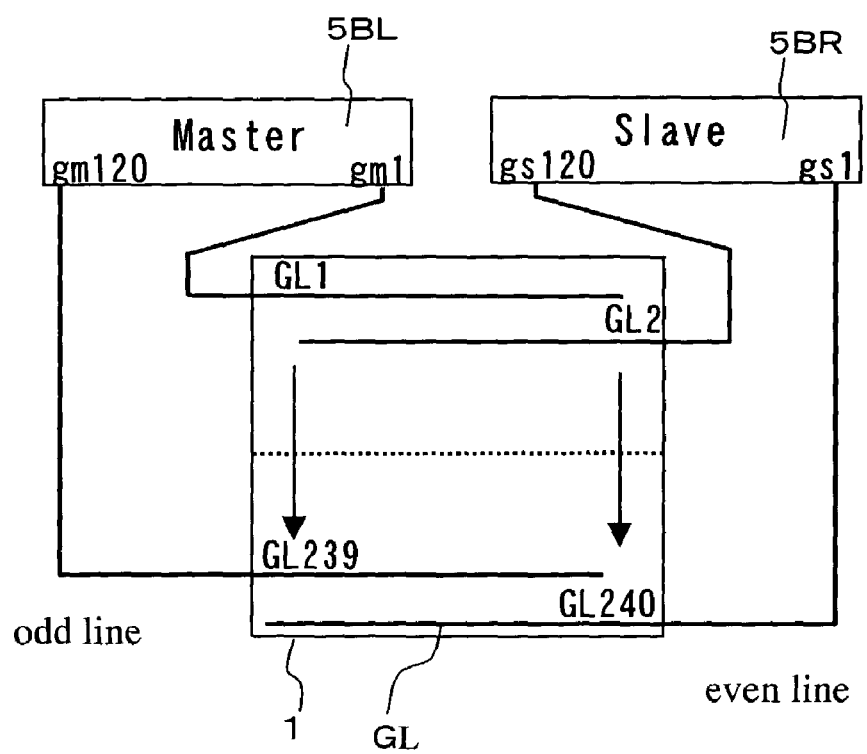

Here, FIG. 12(a) shows a case in which the second driving circuits 5B are arranged at the upper side of the liquid crystal display panel 1 and FIG. 12(b) shows a case in which the second driving circuits 5B are arranged at the lower side of the liquid crystal display panel 1.

Figure 13:
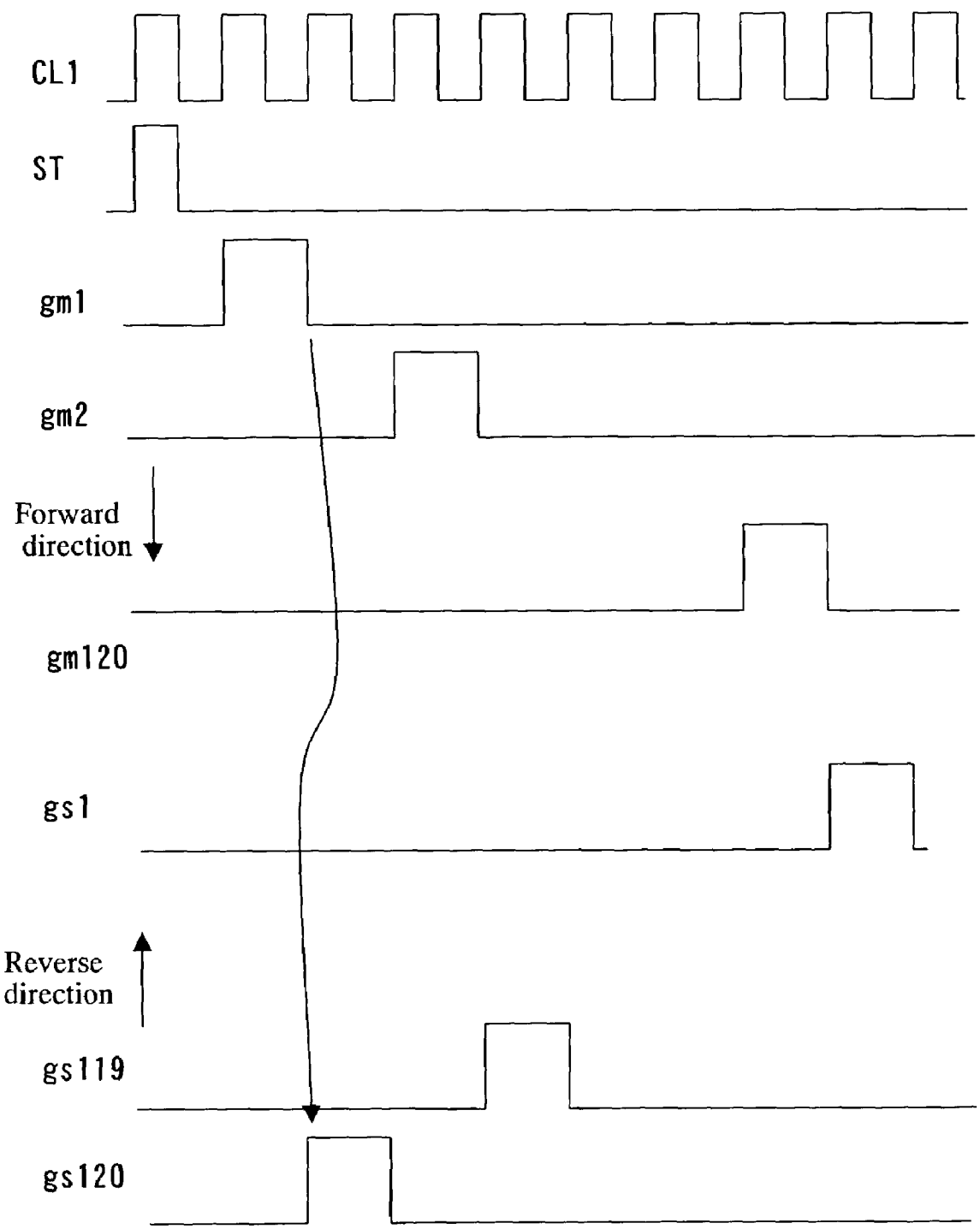
FIG. 13 is a timing chart showing a driving method of the liquid crystal display device shown in FIG. 12.

FIG. 13 is a timing chart of the liquid crystal display device having the constitution shown in FIG. 12. First of all, when the start signal ST is inputted into the second driving circuits 5B, the second driving circuit 5BL which is set as the master outputs the scanning signal from the terminal gm1 in synchronism with the next clock signal CL1. Subsequently, the second driving circuit 5BR which is set as the slave outputs the scanning signal from the terminal gs120. Here, the terminal gm1 is connected to the odd-numbered scanning signal line GL1 of the liquid crystal display panel 1 and the terminal gs120 is connected to the even-numbered scanning signal line GL2 of the liquid crystal display panel 1. Accordingly, in the liquid crystal display panel 1, the scanning signal lines are driven in the order of the odd-numbered scanning signal line and the even-numbered scanning signal line. Thereafter, the outputting is completed when the scanning signal is outputted from the terminal gs1 of the second driving circuit 5BR.

Figure 14A:
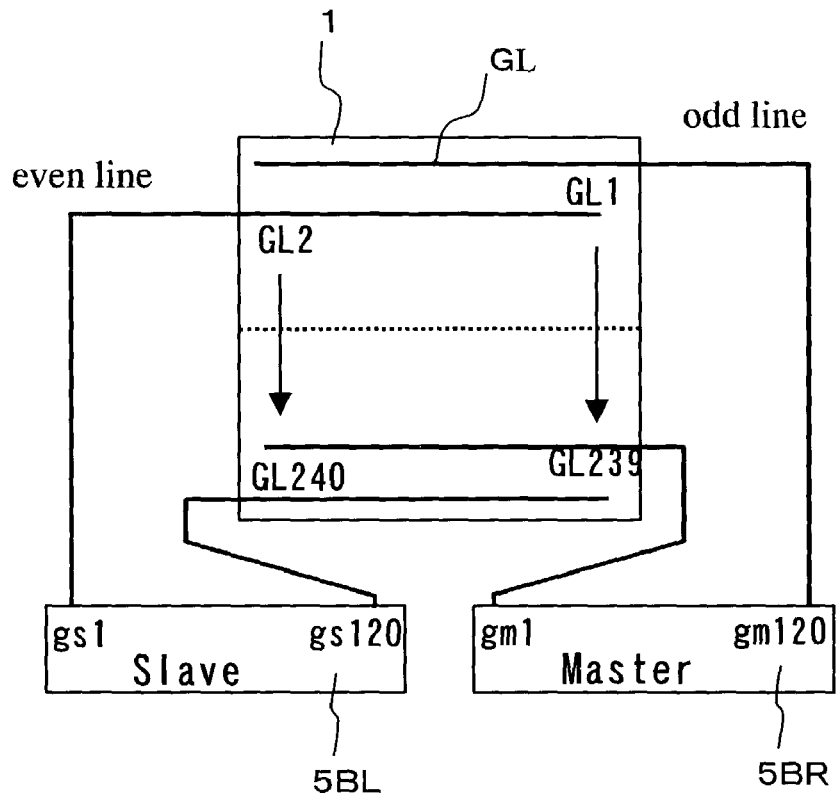
FIG. 14 is a schematic block diagram showing the positional relationship between a driving circuit and a liquid crystal display panel of a liquid crystal display device of one embodiment of the present invention.
Figure 14B:
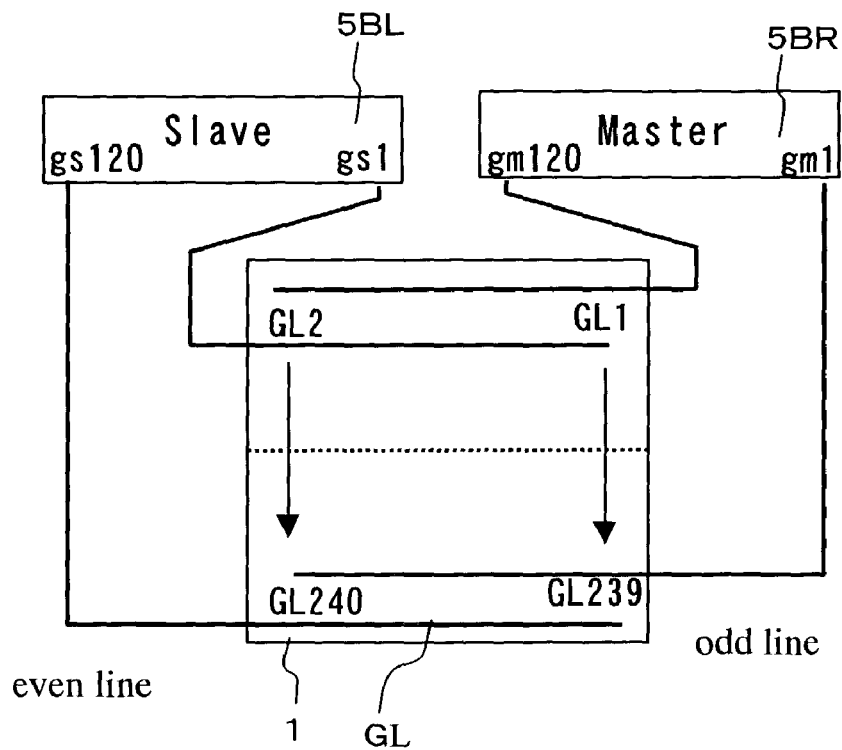

In FIG. 14, a case in which the second driving circuit 5BL at the left side of the drawing is used as the slave and the second driving circuit 5BR at the right side of the drawing is used as the master in the odd/even line output mode is shown. That is, in FIG. 14, the second driving circuit 5BL at the left side in the drawing is set as the slave, and the value of the GS bit instruction signal is set to 1 so that the sequence of starting is the later start and the scanning direction is the normal direction. The second driving circuit 5BR at the right side in the drawing is set as the master, and the value of the GS bit instruction signal is set to 1 so that the sequence of starting is the initial start and the scanning direction is the reverse direction. However, since the mode is set to the odd/even line outputting mode, the slave starts the outputting from the 2nd count of the clock signal CL1 and the master and the slave output alternate scanning signals every count of the clock signal CL1. Here, FIG. 14(a) shows a case in which the second driving circuits 5B are arranged at the lower side of the liquid crystal display panel 1 and FIG. 14(b) shows a case in which the second driving circuits 5B are arranged at the upper side of the liquid crystal display panel 1.

Figure 15:
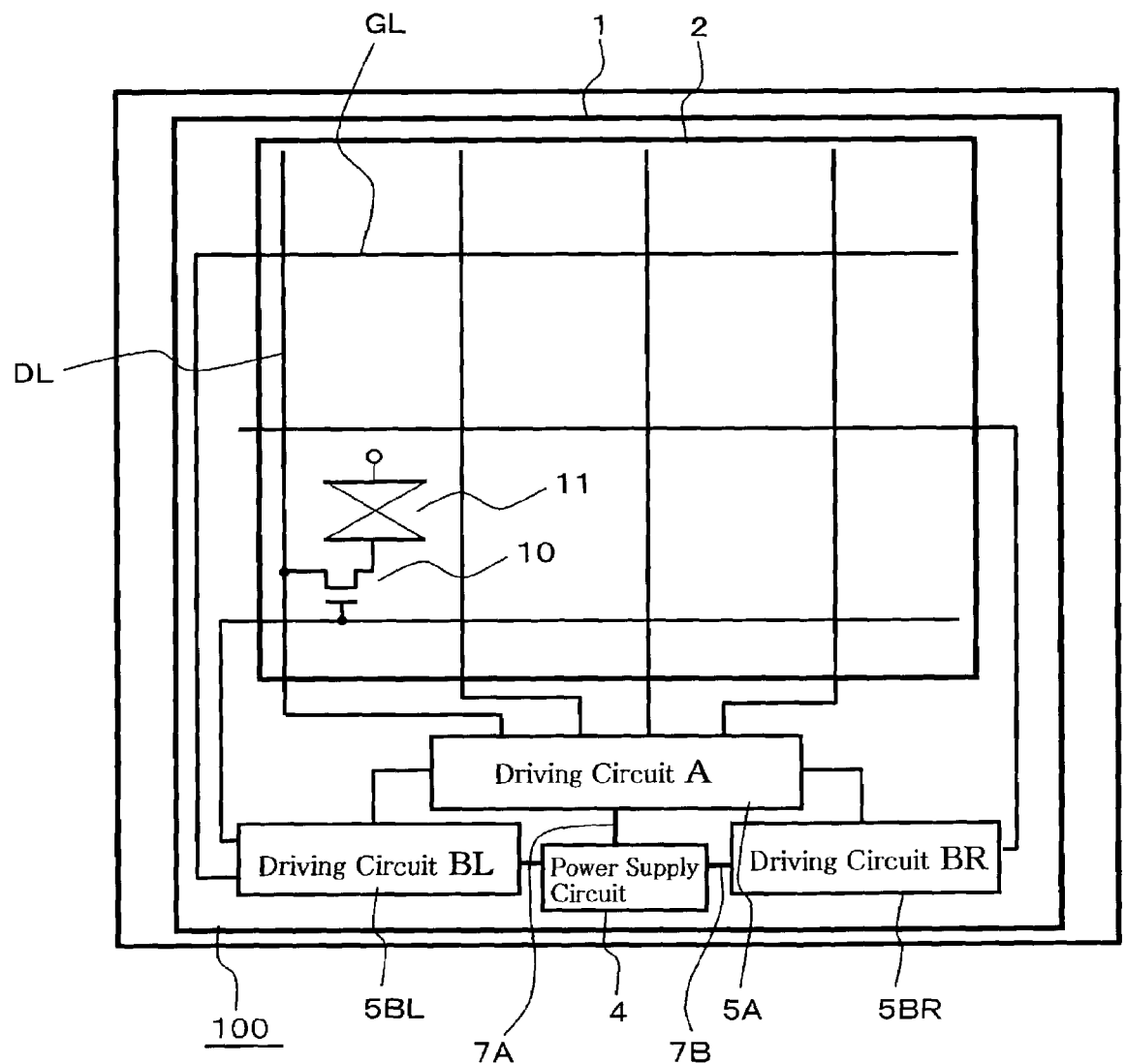
FIG. 15 is a schematic block diagram showing a liquid crystal display device of one embodiment of the present invention.

Subsequently, another arrangement of the second driving circuits 5B with respect to the first driving circuit 5A is shown in FIG. 15. FIG. 15 shows a case in which the second driving circuits 5B have large width and hence the second driving circuits 5B are not arranged in line with the first driving circuit 5A but are arranged such that the second driving circuits 5B are below the first driving circuit 5A. In the arrangement shown in FIG. 15, it is possible to provide the second driving circuits 5B in plural and to arrange the power supply circuit 4 and lines 7A, 7B leading from the power supply circuit 4 to be between the neighboring second driving circuits.

Figure 16:
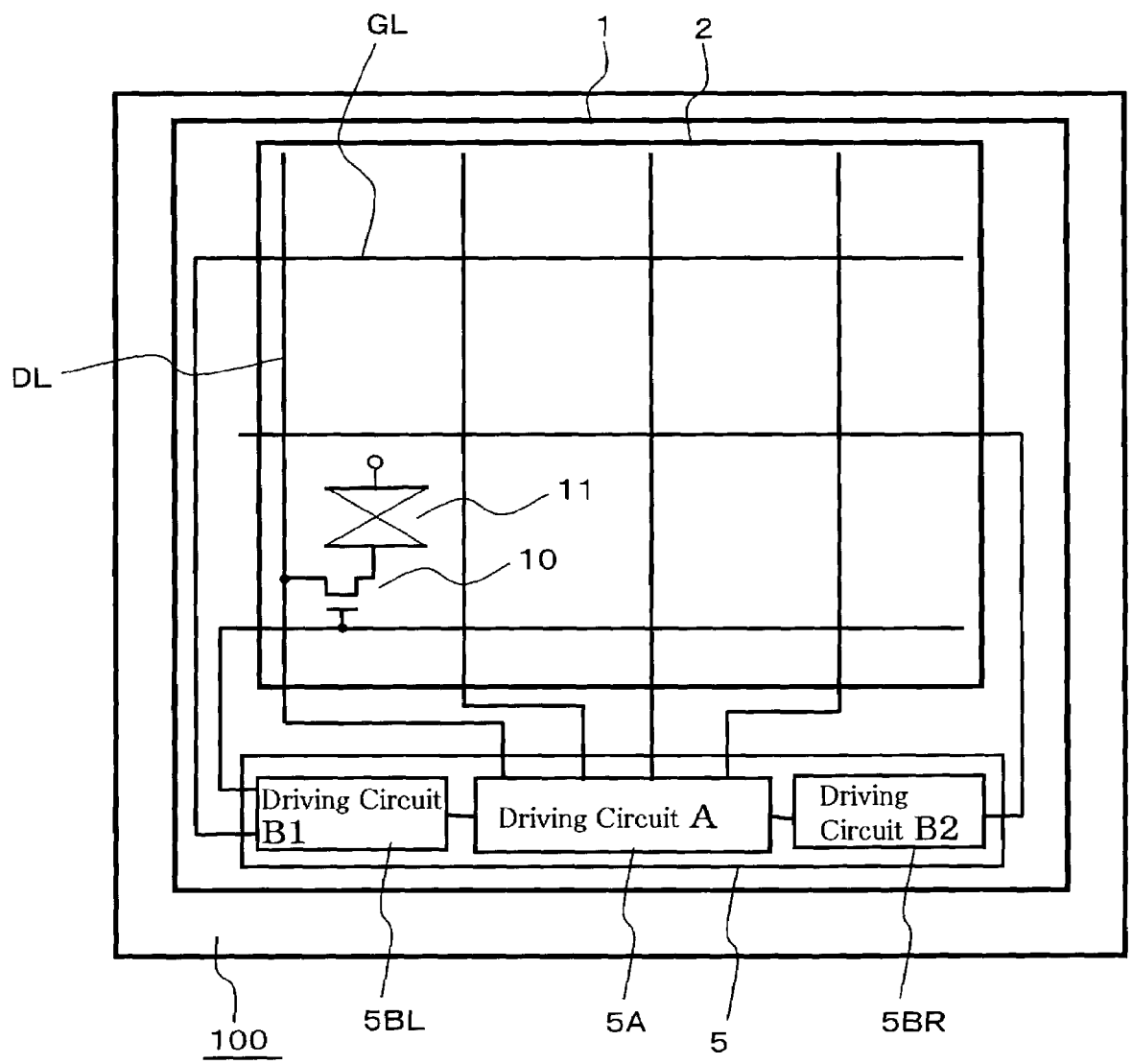
FIG. 16 is a schematic block diagram showing a liquid crystal display device of one embodiment of the present invention.

FIG. 16 shows the constitution in which the first driving circuit 5A and the second driving circuits 5B are formed on one chip. In the same manner as FIG. 5, two second driving circuit 5BL, 5BR are arranged in line. However, respective circuits are formed on one chip using a semiconductor process.

Next, a booster circuit used in the power supply circuit 4 will be explained. In miniaturized portable equipment such as portable telephones, batteries are used popularly as power sources. Further, batteries having an output voltage of approximately 1.5V to approximately 4V are used in view of the great quantity of these on the market. Accordingly, the power supply voltage needed for the liquid crystal display device is generated using a booster circuit.

Figure 17:
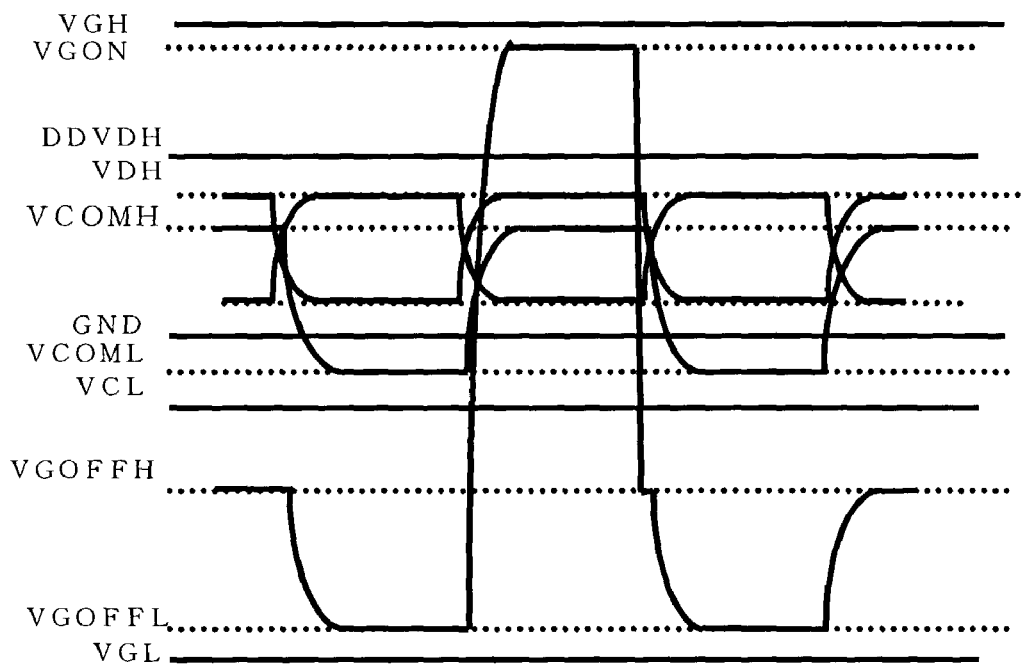
FIG. 17 is a schematic view for explaining a power supply voltage used in a liquid crystal display device of one embodiment of the present invention.

FIG. 17 shows the power supply voltage necessary for the thin film transistor type liquid crystal display device. In FIG. 17, the liquid crystal display device adopts a so-called VCOM inversion driving method in which a voltage VCOM supplied to the counter electrodes 15 shown in FIG. 1 is inverted at a fixed period. In FIG. 17, VGON indicates a HIGH voltage of the scanning signal for turning on the thin film transistor (TFT). It is necessary to set the HIGH voltage VGON to approximately 15V. DDVDH indicates a power supply voltage for the first driving circuit(source driver) 5A shown in FIG. 4. Since the maximum rated voltage of the first driving circuit 5A is 6.0 V, it is necessary to set the power supply voltage to approximately 5.5V.

VDH indicates a gray scale reference voltage. A gray scale voltage is generated in the first driving circuit using the gray scale reference voltage VDH as the reference. Due to the characteristics of liquid crystal material, it is necessary to set the gray scale reference voltage to approximately 5.0V. VCOMH indicates a HIGH voltage for counter electrode and VCOML indicates a LOW voltage for counter electrode. It is necessary to set the HIGH voltage for counter electrode VCOMH to equal to or less than 5.0V and it is necessary to set the LOW voltage for counter electrode VCOML to equal to or more than −2V. VGOFFH indicates an OFF-HIGH voltage for scanning signal line and VGOFFL indicates an OFF-LOW voltage for scanning signal line. The OFF-LOW voltage for scanning signal line VGOFFL is the voltage below which the thin film transistor turns off and the OFF-HIGH voltage for scanning signal line VGOFFH is the voltage causing the storage capacitive structure Cadd to function. It is necessary to set the OFF-LOW voltage VGOFFL to approximately −12V and it is necessary to set the OFF-HIGH voltage VGOFFH to approximately −7V.

VCL indicates a power supply for generating voltage for counter electrode. That is, VCL indicates a power supply voltage for generating the LOW voltage for the counter electrode. In view of an operational margin of a VCOML generation circuit, it is necessary to set the power supply voltage VCL to approximately −2.5V. VGH indicates a HIGH power supply for the second driving circuit 5B (gate driver) and VGL indicates a LOW power supply for the second driving circuit 5B. Since a maximum rated voltage of the second driving circuit 5B is 35V, it is necessary to set the HIGH power supply VGH to 16.5V and to set the LOW power supply voltage VGL to −16.5V.

Among the above-mentioned power supplies necessary for the liquid crystal display device, the power supply voltage DDVDH for the first driving circuit 5A, the HIGH power supply VGH for the second driving circuit 5B, the LOW power supply VGL for second driving circuit 5B and the power supply VCL for generating voltage for counter electrode are formed using a charge pump type booster circuit, while other voltages are formed by dividing the voltages generated by the booster circuit.

Figure 18A:
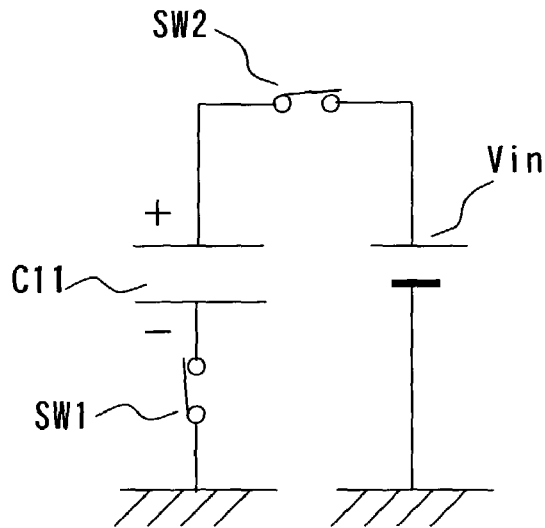
FIG. 18 is a schematic circuit diagram for explaining a booster circuit used in a liquid crystal display device of one embodiment of the present invention.
Figure 18B:
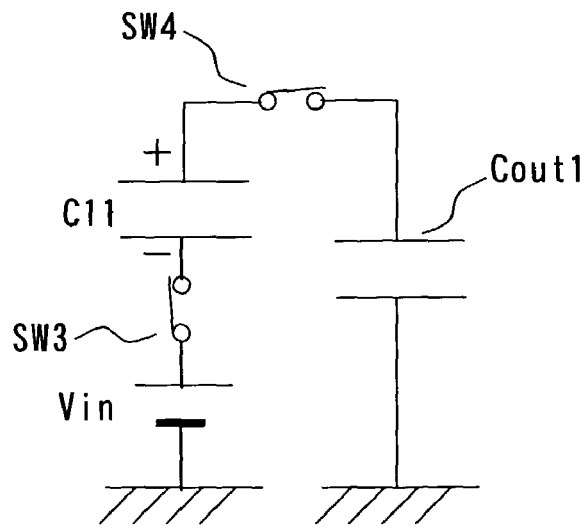

The operational principle of the charge pump type booster circuit is explained in conjunction with FIG. 18 by using boosting to double voltage as an example. The booster circuit is constituted of an input power supply Vin, a booster capacitor C11, a holding capacitor Cout1 and changeover switches SW1, SW2 and realizes a charged state shown in FIG. 18(a) and a discharged state shown in FIG. 18(b) using these changeover switches SW1, SW2. First of all, in the charged state shown in FIG. 18(a), one electrode of the booster capacitor C11 is connected to a GND potential by the changeover switch SW1 and the other electrode of the booster capacitor C11 is connected to the input power supply Vin by the changeover switch SW2 so that the booster capacitor C11 is connected in parallel to the input power supply Vin. Accordingly, a charge amounting to the input power supply Vin is charged into the booster capacitor C11.

Subsequently in FIG. 18(b), to apply the input power supply Vin to the booster capacitor C11, with the use of the changeover switch SW3, the input power supply Vin is connected in series to the electrode of the booster capacitor C11 which is connected to the GND potential in FIG. 18(a). At this point of time, the voltage of the other electrode of the booster capacitor C11 becomes twice the input power supply Vin. The holding capacitor Cout1 is connected to the booster capacitor C11 and the input power supply Vin in parallel using the changeover switch SW4. Accordingly, the voltage 2×Vin is held in the holding capacitor Cout1.

Informing the above-mentioned power supply voltage DDVDH for the first driving circuit 5A, the HIGH power supply VGH for the second driving circuit 5B, the LOW power supply VGL for second driving circuit 5B and the power supply VCL for generating voltage for counter electrode in the booster circuit shown in FIG. 18, if the input power supply Vin is 3V, the power supply voltage DDVDH for the first driving circuit 5A is approximately 6V, and a booster circuit which doubles the input power supply Vin is necessary. In the same manner, since the HIGH power supply VGH for the second driving circuit 5B is approximately 15V, a booster circuit which multiplies the input power supply Vin by 5 is necessary. In the same manner, since the LOW power supply VGL for second driving circuit 5B is approximately −15V, a booster circuit which multiplies the input power supply Vin by −5 is necessary. Further, since the power supply VCL for generating voltage for counter electrode is approximately −3V, a booster circuit which multiplies the input power supply Vin by −1 is necessary.

Figure 19:
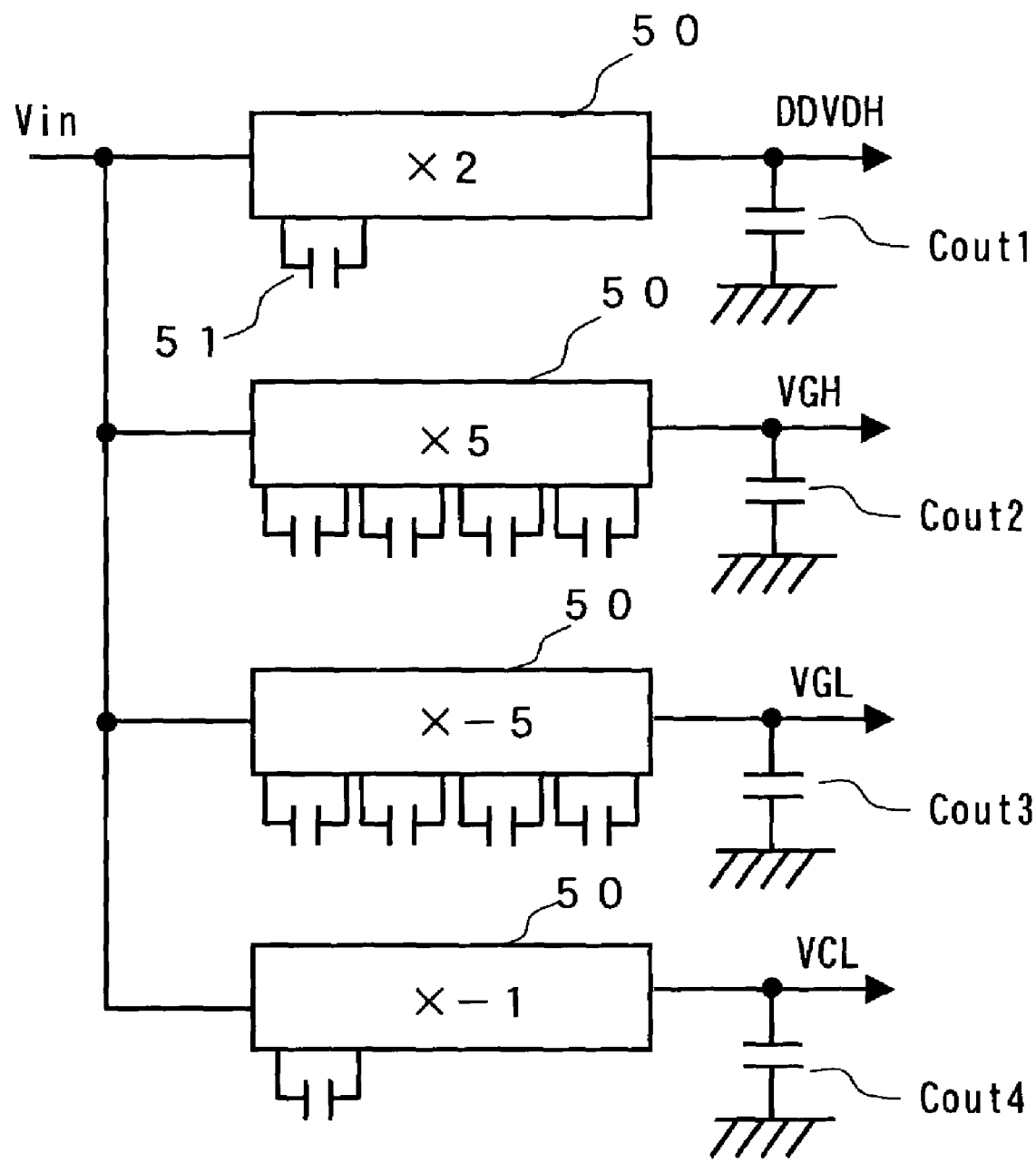
FIG. 19 is a schematic circuit diagram for explaining a booster circuit used in a liquid crystal display device of one embodiment of the present invention.

FIG. 19 shows the constitution of booster circuits 50 which multiplies the input power supply Vin by 2, by 5, by −5, and by −1. Here, when the input power supply Vin is multiplied by −5 or by −1, the booster circuit is used as a circuit which forms a voltage different from the input voltage. The circuit shown in FIG. 19 uses a large number of capacitors 51 as parts which are externally mounted by the circuits and hence, there arises a problem that the number of mounting parts is large so that the mounting area is enlarged. In the drawing, Cout1 to Cout4 are holding capacitors for holding output voltages.

Figure 20:
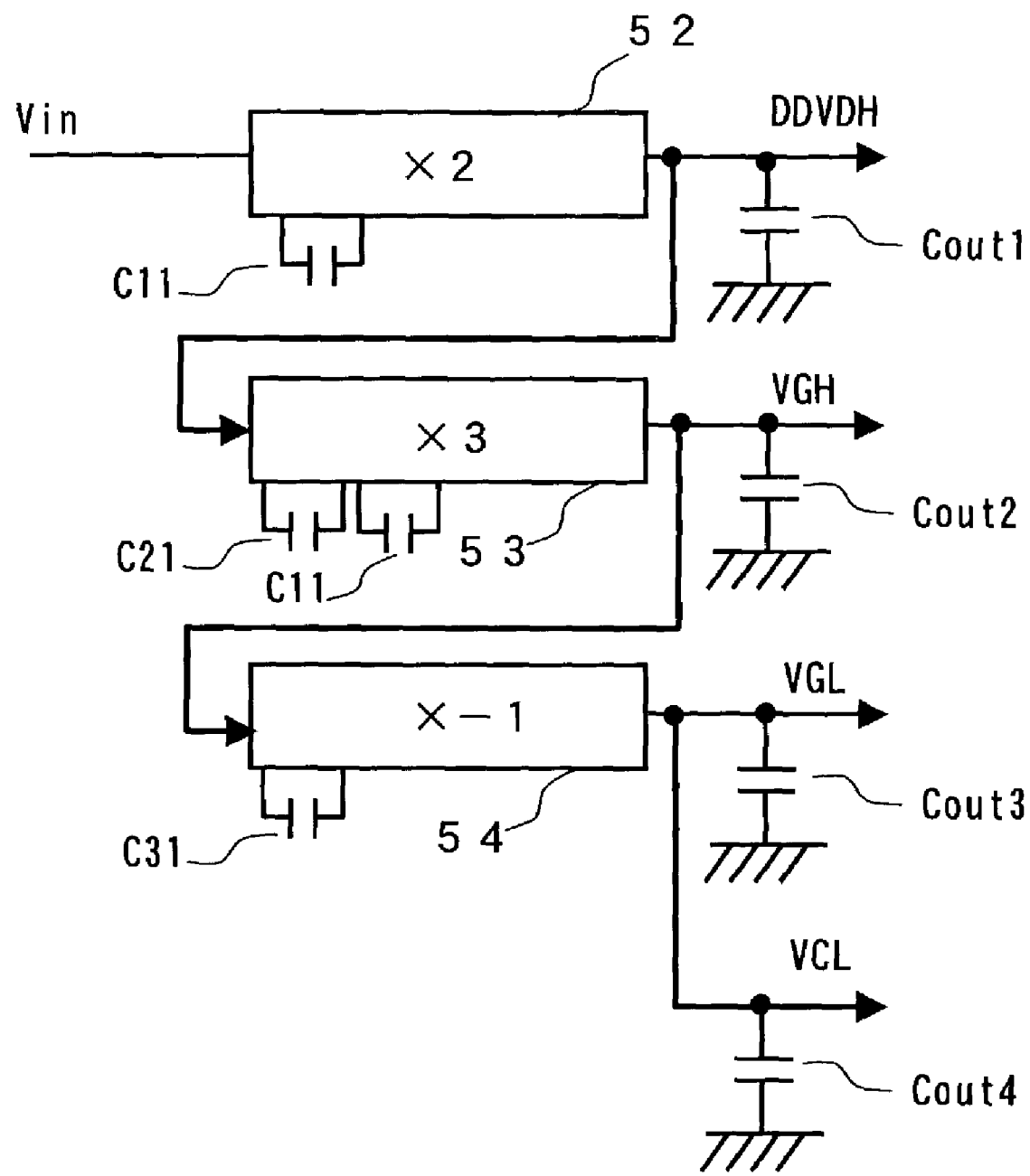
FIG. 20 is a schematic circuit diagram for explaining a booster circuit used in a liquid crystal display device of one embodiment of the present invention.

Subsequently, the constitution which can decrease the number of capacitors 51 by making use of the outputs of the booster circuits 50 as an input power supply is shown in FIG. 20. Since the input power supply Vin is multiplied twice in a booster circuit 52, by making use of an output voltage of the booster circuit 52, it is possible to form a voltage 18V which is 6 times as large as the input power supply Vin by multiplying the output voltage of the booster circuit 52 by 3, and this voltage 18V is sufficient to be used as the HIGH power supply VGH for the second driving circuit 5B which is approximately 15V. Further, by making use of the output from the booster circuit 53, a booster circuit 54 can form a voltage −18V by multiplying the output voltage of the booster circuit 53 by −1 time and the voltage −18V can be used as the LOW power supply VGL for the second driving circuit 5B and the power supply VCL for generating voltage for counter electrode. The circuit shown in FIG. 20 can decrease the number of externally mounted capacitors 51 from the ten pieces in the circuit shown in FIG. 19 to four pieces. However, when the voltage −18V is used as the power supply VCL for generating voltage for counter electrode, there arises a problem that the voltage VCL for generating voltage for counter electrode is approximately −3V and hence, the efficiency is worsened.

Figure 21:
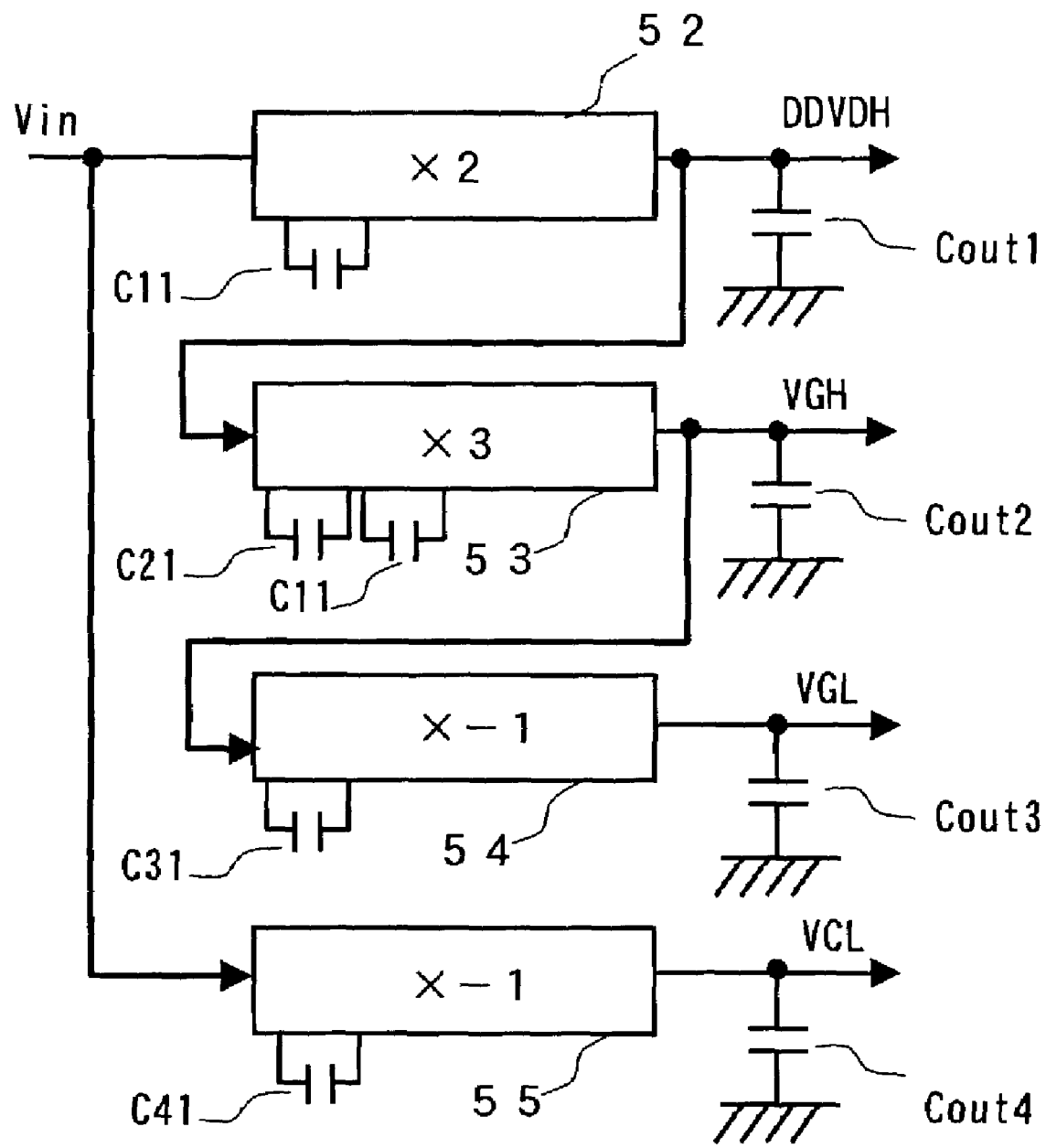
FIG. 21 is a schematic circuit diagram for explaining a booster circuit used in a liquid crystal display device of one embodiment of the present invention.

FIG. 21 shows a circuit in which the power supply VCL for generating voltage for counter electrode is formed using the input power supply Vin. In FIG. 21, the power supply VCL for generating voltage for counter electrode whose efficiency is worsened is now generated by multiplying the input power supply Vin by −1 time using a booster circuit 55.

Figure 22A:
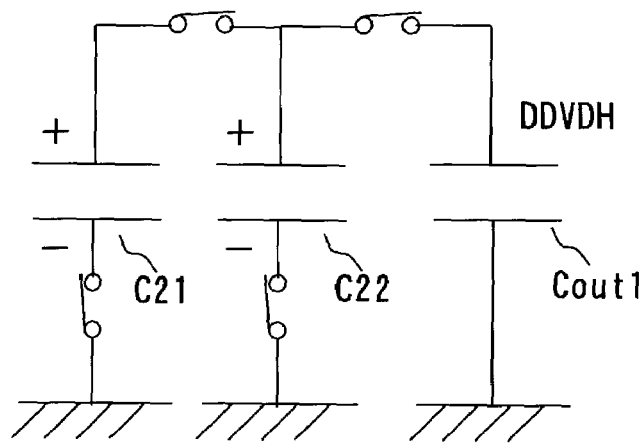
FIG. 22 is a schematic circuit diagram for explaining a booster circuit used in a liquid crystal display device of one embodiment of the present invention.
Figure 22B:
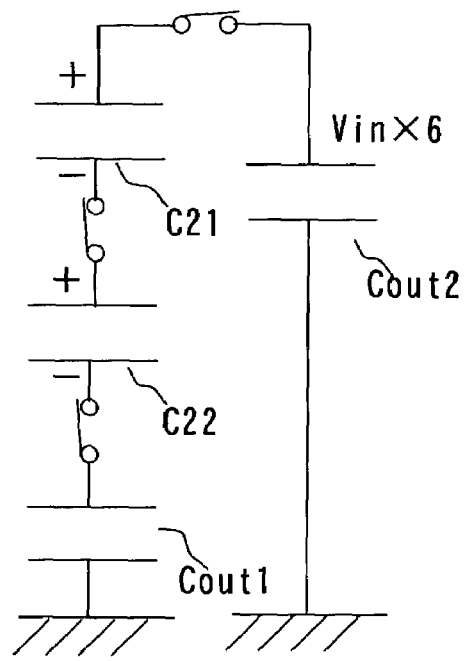
Figure 22C:
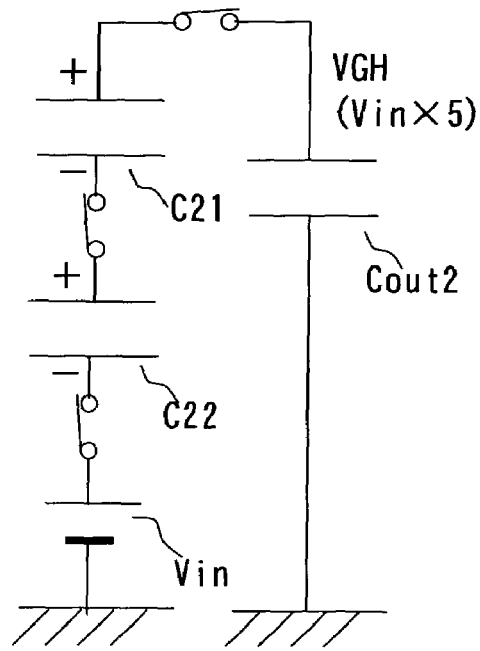

The manner of operation of the booster circuit 53 is explained in conjunction with FIG. 22. In FIG. 22(a), the booster capacitors C21 and C22 are charged with a voltage DDVDH which constitutes an output of the holding capacitor Cout1 of the booster circuit 52. Thereafter, in FIG. 22(b), by connecting the booster capacitors C21, C22 and the holding capacitor Cout1 in series, a voltage which is 3 times as large as the voltage DDVDH and is 6 times as large as the input power supply Vin is formed. In FIG. 22(c), by using the input power supply Vin in place of the holding capacitor Cout1, by connecting the booster capacitors C21, C22 and the input power supply Vin in series, it is possible to hold a voltage which is 5 times as large as the input power supply Vin in the holding capacitor Cout2 as the output voltage.

Figure 23A:
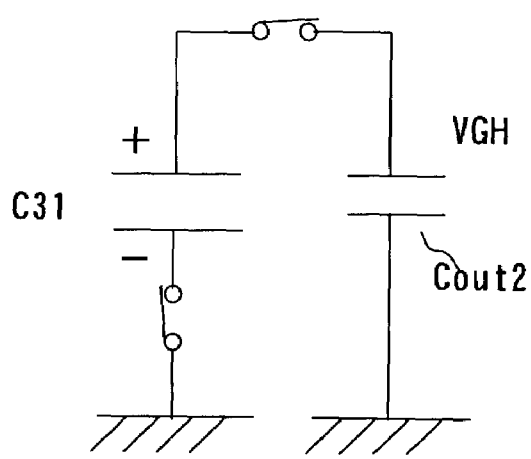
FIG. 23 is a schematic circuit diagram for explaining a booster circuit used in a liquid crystal display device of one embodiment of the present invention.
Figure 23B:
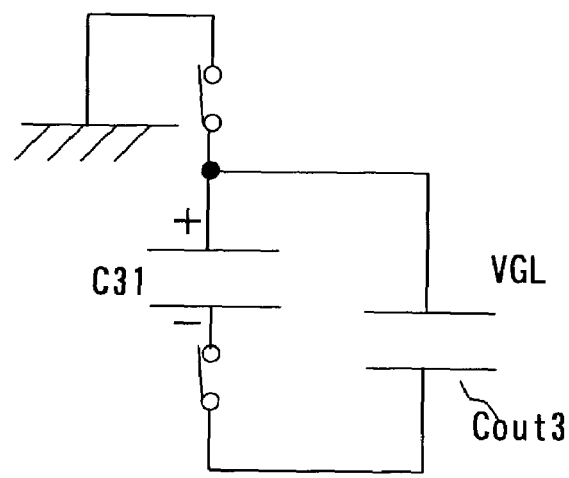

The manner of operation of the booster circuit 54 is explained in conjunction with FIG. 23. In FIG. 23(a), booster capacitor C31 is charged with the voltage VGH which constitutes an output of the holding capacitor Cout2 of the booster circuit 53. Thereafter, in FIG. 23(b), by connecting a positive electrode of the booster capacitor C31 to the GND potential, a voltage VGL whose polarity is inverted with respect to the voltage VGH is formed. By connecting the booster capacity 31 and the holding capacitor Cout3 in parallel, the voltage VGL is held in the holding capacitor Cout3.

Figure 24A:
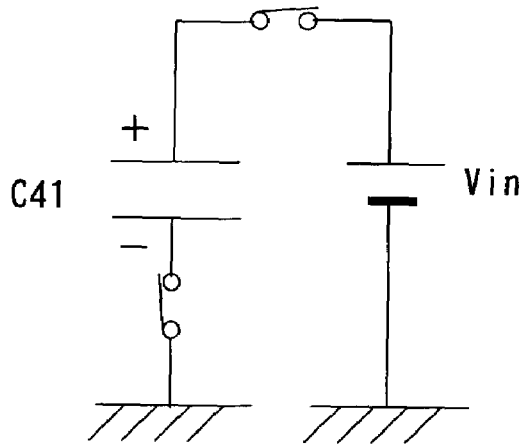
FIG. 24 is a schematic circuit diagram for explaining a booster circuit used in a liquid crystal display device of one embodiment of the present invention.
Figure 24B:
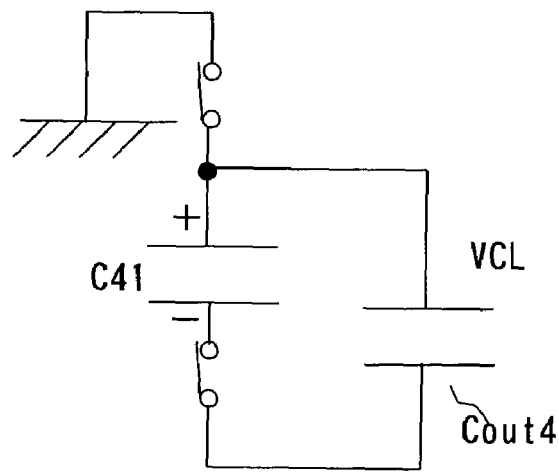

Subsequently, the operation of the booster circuit 55 is explained in conjunction with FIG. 24. In FIG. 24(a), the booster capacitor C41 is charged at the voltage Vin using the input power supply Vin. Thereafter, in FIG. 24(b), the positive electrode of the booster capacitor C41 is connected to the GND potential thus forming the voltage VCL having the polarity opposite to the polarity of the input power supply Vin. By connecting the booster capacitor C41 and the holding capacitor Cout4 in parallel, the voltage VCL is held in the holding capacitor Cout4.

Figure 25:
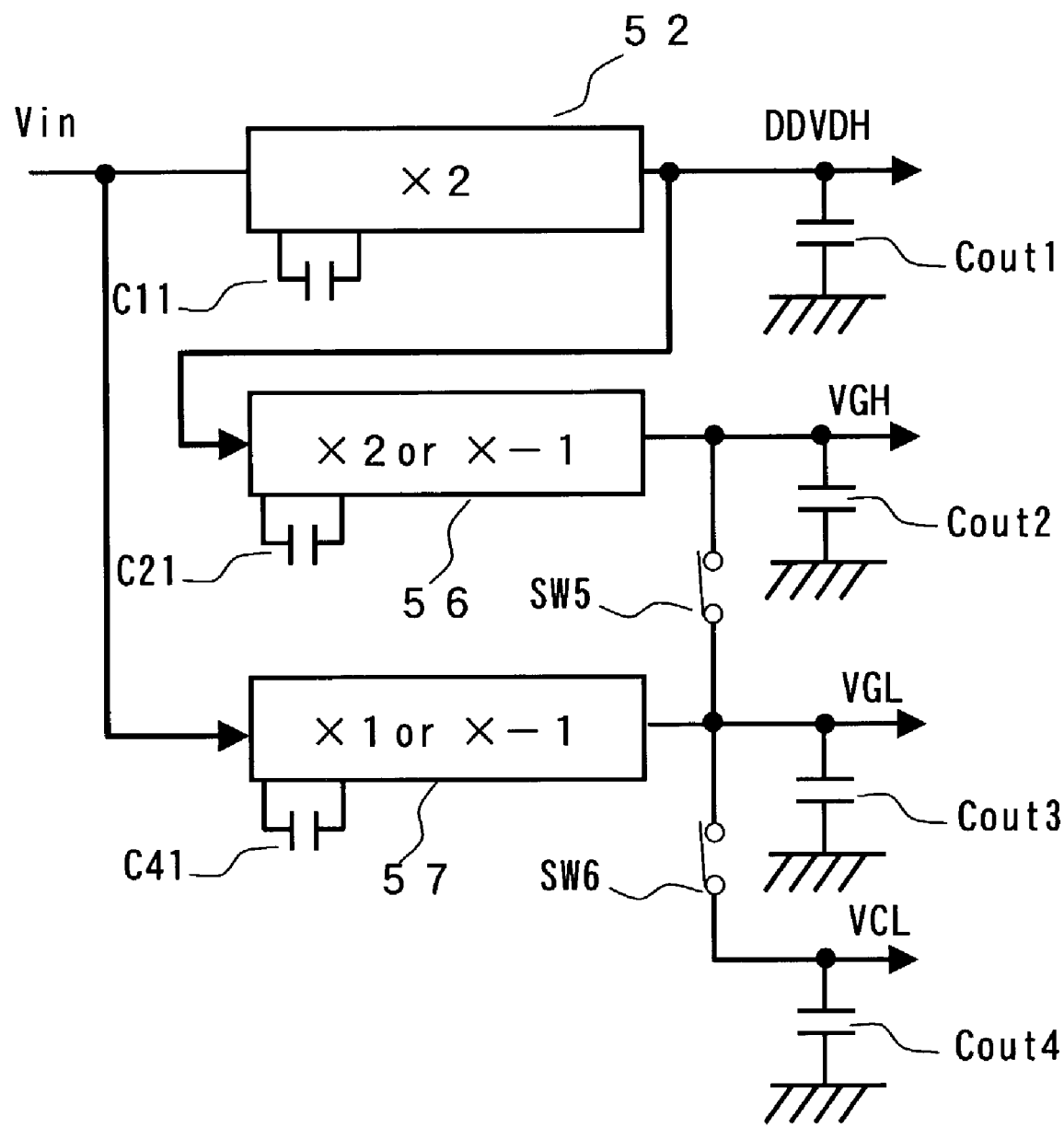
FIG. 25 is a schematic circuit diagram for explaining a booster circuit used in a liquid crystal display device of one embodiment of the present invention.

Then, the method for reducing the number of externally mounted capacitors is explained in conjunction with FIG. 25. In FIG. 25, the externally mounted capacitors are used in common to form voltages VGH, VGL, VCL. In FIG. 25, necessary voltages are formed by changing the connection between the outputs of booster circuits 56, 57 with the holding capacitors Cout2, Cout3, Cout4 using switches SW5, SW6. In the circuit shown in FIG. 25, the number of externally mounted capacitors are set to 3 and hence, the number of externally mounted parts is reduced.

With respect to the booster circuits shown in FIG. 19, to form five-times multiplied voltage, five capacitors are necessary. That is, the capacitors in number equal to the degree of multiplication is necessary for obtaining the boosted voltage. To the contrary, in the booster circuits shown in FIG. 20 and FIG. 21, by making use of the boosted voltage which is held by the holding capacitors Cout1, Cout2, capacitors can be omitted so that the number of parts can be reduced. Further, in the circuit shown in FIG. 25, by inverting the connection between the negative voltage and the capacitor and by making use of the input power supply Vin together with the boosted voltages in the holding capacities, the capacitors can be used in common so that the number of parts can be reduced. The reason that the number of capacitors can be reduced and the capacitors can be used in common is as follows. The power supply peculiar, to the liquid crystal display device is comprised of a plurality of power supplies such as the power supply voltage DDVDH for first driving circuit 5A, the HIGH power supply VGH for second driving circuit 5B, the LOW power supply VGL for second driving circuit 5B, and the power supply VCL for generating voltage for counter electrode, and includes negative voltage and hence, it is possible to use the externally mounted capacitors in common among a plurality of boosting circuits and to make use of the boosted voltages.

Figure 26A:
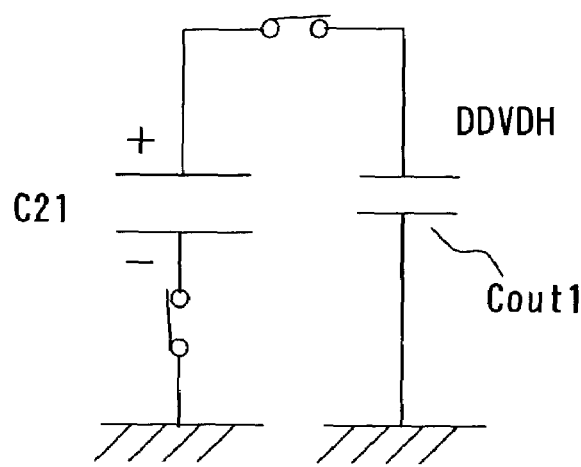
FIG. 26 is a schematic circuit diagram for explaining a booster circuit used in a liquid crystal display device of one embodiment of the present invention.
Figure 26B:
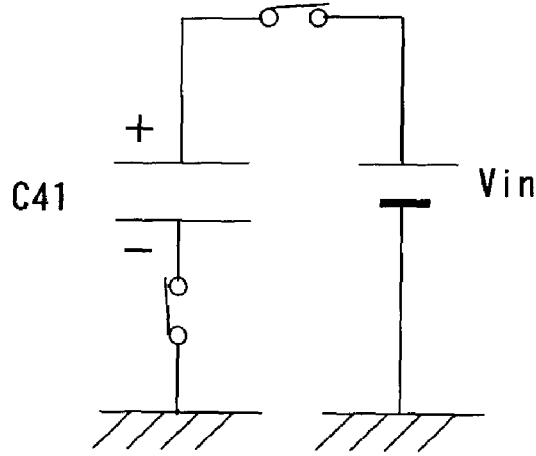
Figure 26C:
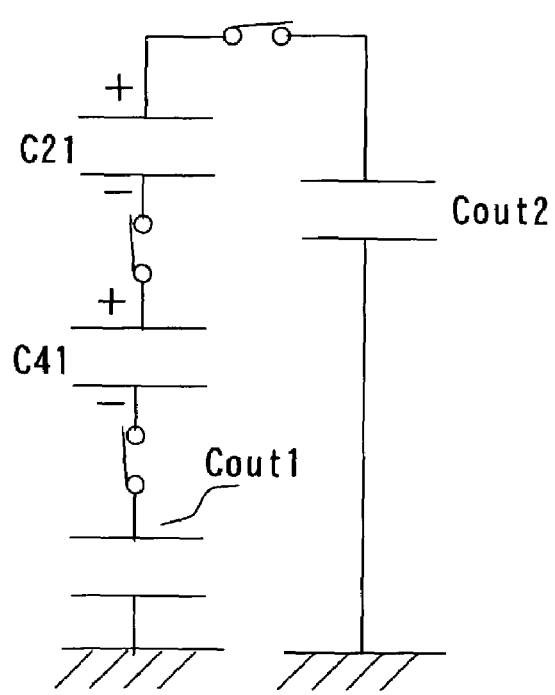

The manner of operation of the circuit shown in FIG. 25 is explained in conjunction with FIG. 26. To form the voltage VGH, the voltage DDVDH is multiplied by 2 in the booster circuit 56, the input power supply Vin is multiplied by 1 in the booster circuit 57, the output of the booster circuit 57 is connected to the holding capacitor Cout2 by the switch SW5, and the output voltage of the booster circuits 56, 57 is held, thus making it possible to form the voltage VGH. In FIG. 26(*a*), the output voltage DDVDH of the booster circuit 52 is charged into the booster capacitor C21, while in FIG. 26(*b*), the input power supply Vin is charged into the booster capacitor C41. Thereafter, as shown in FIG. 26(*c*), by connecting the booster capacitors C21, C41 and the holding capacitors Cout1 in series, the voltage VGH can be formed.

Figure 27A:
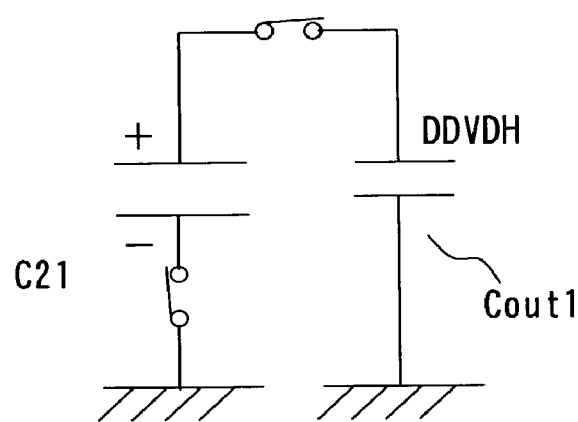
FIG. 27 is a schematic circuit diagram for explaining a booster circuit used in a liquid crystal display device of one embodiment of the present invention.
Figure 27C:
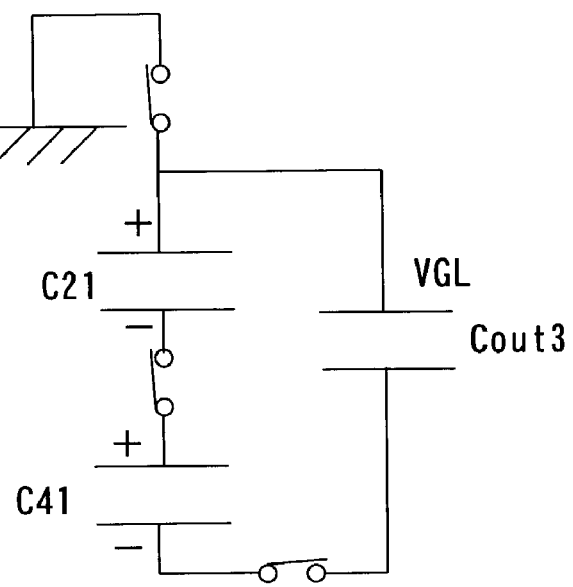
Figure 27B:
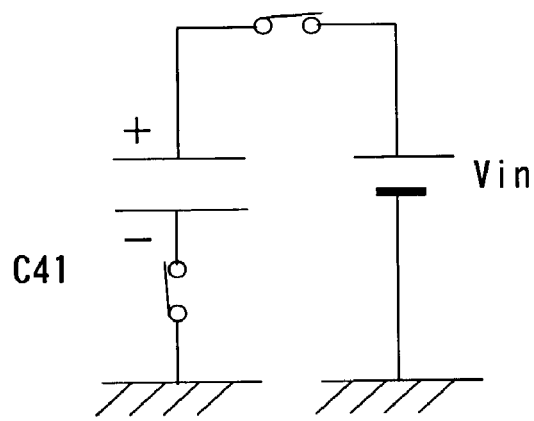

Subsequently, the manner of forming the voltage VGL is explained in conjunction with FIG. 27. To form the voltage VGL, the voltage DDVDH is multiplied by −1 in the booster circuit 56, the input power supply Vin is multiplied by −1 time in the booster circuit 57, and the output voltage is held by the holding capacitor Cout3 thus forming the voltage VGL. In FIG. 27(*a*), the voltage DDVDH is charged into the booster capacitor C21, while in FIG. 27(*b*), the input power supply Vin is charged into the booster capacitor C41. After charging, as shown in FIG. 27(*c*), by connecting the booster capacitors C41, C21 in series such that their polarities become opposite to each other, the voltage VGL can be formed. Here, although the voltage VGL becomes −9V, the value falls in a range which causes no problem in holding the thin film transistor 10 in an OFF state.

The voltage VCL is formed by performing the operations similar to the method explained in conjunction with FIG. 24. Although the voltages can be formed by using the externally mounted booster capacitors in common, since the booster capacitors C21 and C41 can be used in common, it is necessary to shift times for charging to be different from the times for holding. That is, it is necessary to shift the timing of an operation 1 for holding the holding capacitor Cout2 by charging the booster capacitors C21, C41 and the timing of an operation 2 for holding the capacity at the capacitor Cout3 by charging the booster capacitors C21, C41. When the charging time and the holding time are operated at the same time, since it is necessary to shift the timing, the duty cycle lowers from 50% to 25%.

Figure 28A:
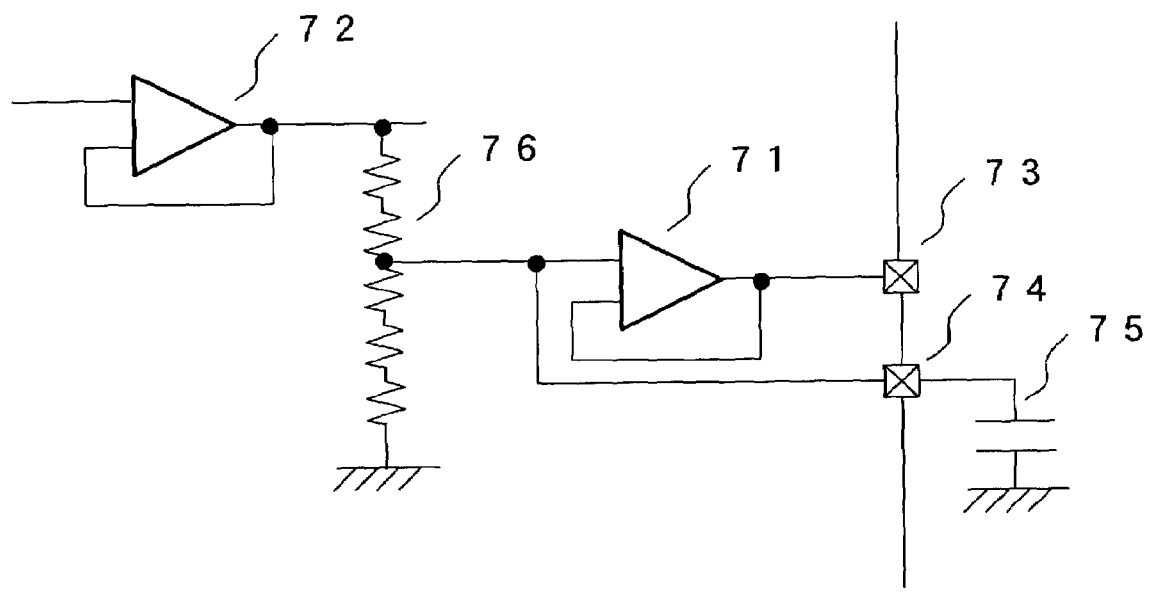
FIG. 28 is a schematic circuit diagram for explaining an outputting circuit used in a liquid crystal display device of one embodiment of the present invention.
Figure 28B:
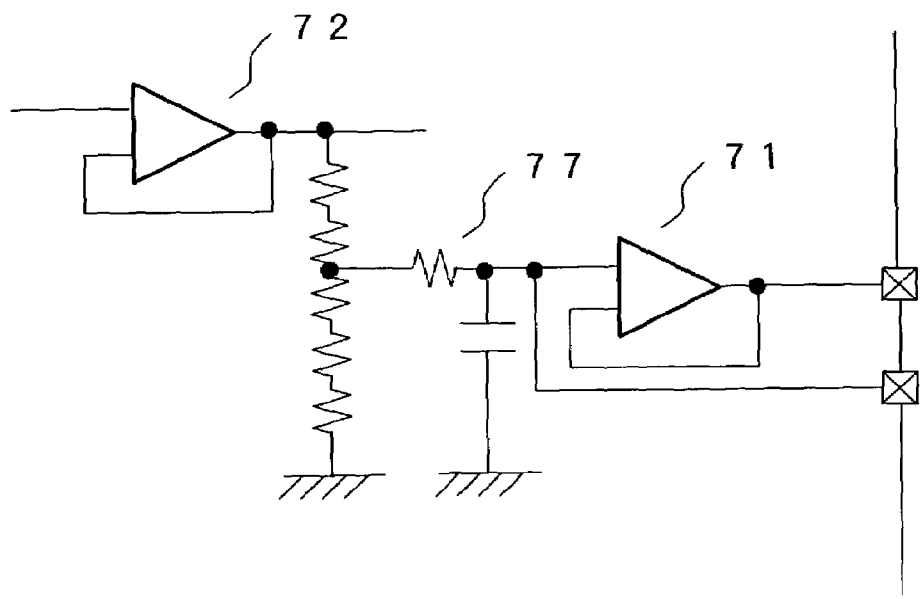

Next, another method for reducing the number of externally mounted capacitors is explained in conjunction with FIG. 28. FIG. 28 is a schematic circuit diagram showing an output circuit of the driving circuit 5. Numeral 71 indicates an output amplifier, and the output of the output amplifier 71 is outputted from a terminal 73 to the outside. Numeral 72 indicates an inner amplifier, and an inner resistance 76 is connected between the inner amplifier 72 and the output amplifier 71. However, inner resistance 76 having high resistance is used between the inner amplifier 72 and the output amplifier 71 for reducing the power consumption, the current is small and noises are carried on signals so that the input level of the output amplifier 71 has been unstable.

Accordingly, as shown in FIG. 28(*a*), by taking out the terminal 74 from the input of the output amplifier 71 and connecting the terminal 74 to the externally mounted capacitor 75, the input of the output amplifier 71 has been made stable. However, along with a demand for further miniaturization of the miniaturized portable equipment, there arises the necessity for reducing the area for mounting externally mounted parts. Accordingly, as shown in FIG. 28(*b*), a low-pass filter 77 is connected to the input of the output amplifier 71 so as to make the input of the output amplifier 71 stable and to reduce the number of externally mounted parts.

Figure 29:
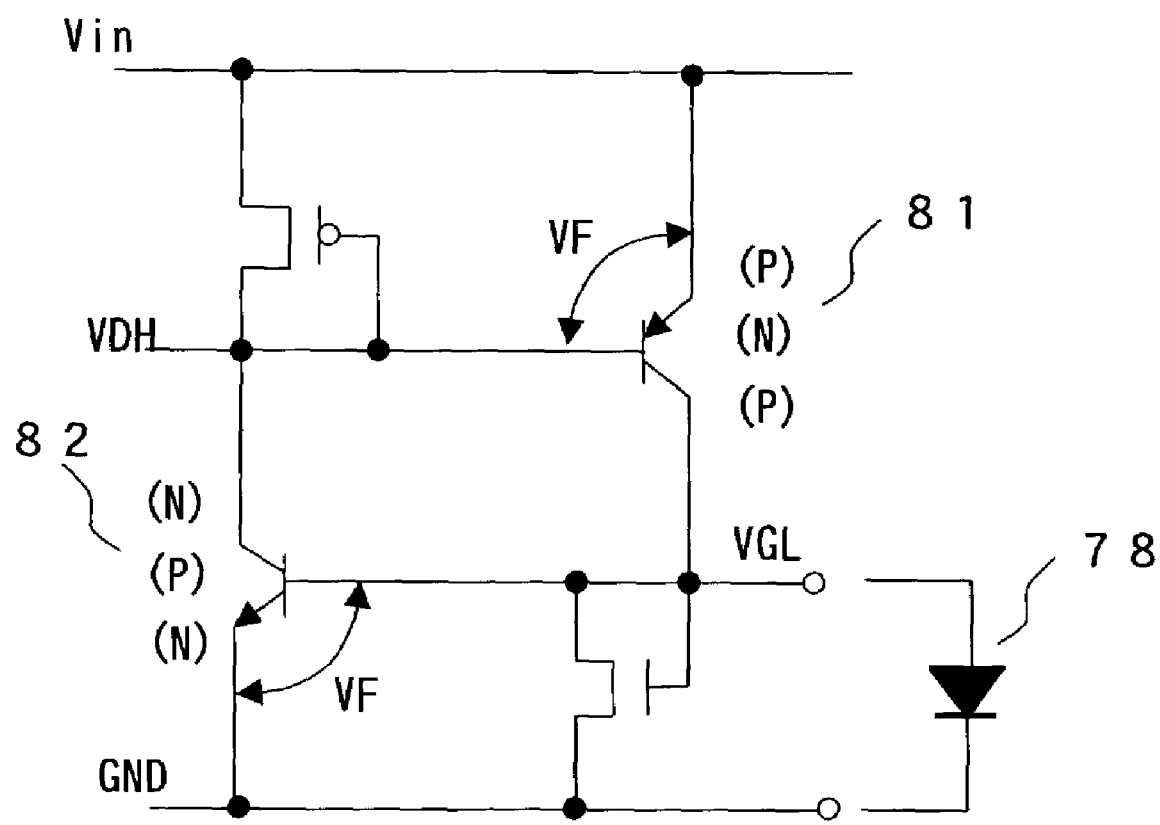
FIG. 29 is a schematic circuit diagram for explaining a point of time that electricity is supplied to a driving circuit used in a liquid crystal display device of one embodiment of the present invention.
Figure 30A:
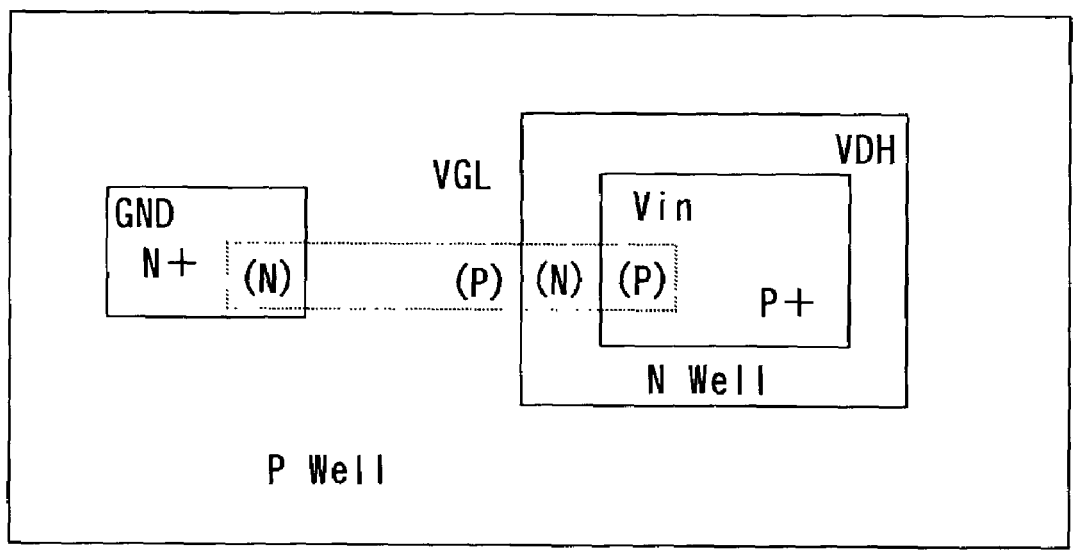
FIG. 30 includes a schematic plan view and a schematic cross-sectional view for explaining a point of time that electricity is supplied to a driving circuit used in a liquid crystal display device of one embodiment of the present invention.
Figure 30B:
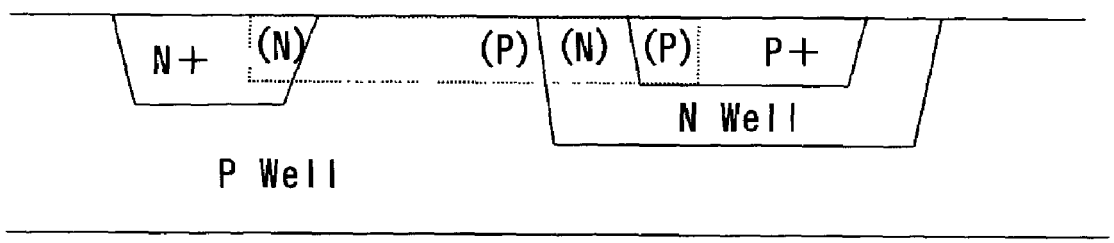

Subsequently, problems which arise in forming the power supply voltage using the booster circuits are explained. In forming the power supply voltage using the booster circuits, the power source voltage is not set to a given voltage when electricity is supplied to the miniaturized portable equipment. Accordingly, the inside of the driving circuit 5 assumes the power supply voltage states shown in FIG. 29 and FIG. 30. In FIG. 29, numeral 81 indicates a parasitic PNP bipolar transistor and numeral 82 indicates a parasitic NPN bipolar transistor. These parasitic bipolar transistors constitute an NPNP thyristor and a PNPN thyristor. When a voltage between Vin-VDH and a voltage between GND-VGL exceed a threshold value VF of the thyristor, the thyristor cannot be turned off. However, when electricity is supplied, the power supply VGL assumes a potential equal to or more than the GND potential and hence, the power supply voltage VDH of the driving circuit 5 also assumes a potential equal to or below the input power supply Vin. Accordingly, a large current flows between Vin-GND and the thyristor cannot be turned off and a latch-up phenomenon arises. Here, the power supply VGL shown in FIG. 30 is applied to the driving circuit as the substrate potential.

Accordingly, to prevent the latch-up phenomenon as shown in FIG. 29, using an externally mounted diode 78, the voltage between GND-VGL is fixed such that the voltage does not exceed a threshold value VF of the thyristor. However, to reduce the number of externally mounted parts, there is provided a starting auxiliary circuit which detects a level of the power source voltage in the inside of the circuit and separates the substrate potential VGL and the GND potential.

Figure 31:
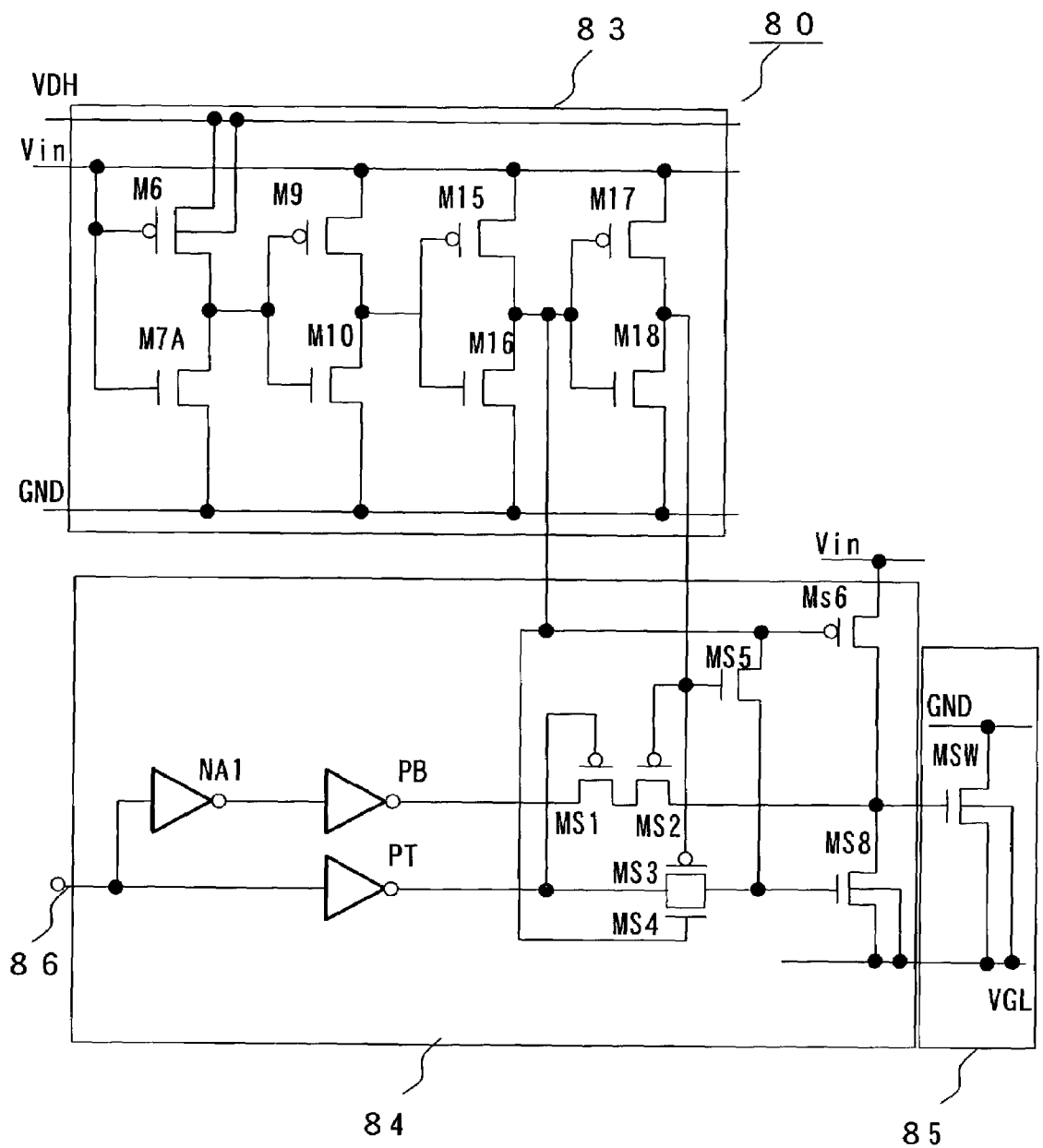
FIG. 31 is a schematic circuit diagram for explaining a starting auxiliary circuit used in a liquid crystal display device of one embodiment of the present invention.

FIG. 31 shown the circuit constitution of the starting auxiliary circuit 80. Numeral 83 indicates a power supply voltage level detection circuit. The power supply voltage level detection circuit 83 discriminates whether the power supply voltage VGH of the driving circuit 5 is elevated with respect to the input power supply Vin. Numeral 85 indicates a short-circuiting switch circuit. The short-circuiting switch circuit 85 can directly short circuit the substrate potential VGL and the GND potential. Numeral 84 indicates a control circuit. Upon determining that the power supply voltage VDH is elevated with respect to the input power supply Vin using the power supply voltage level detection circuit 83, the control circuit 84 controls the short-circuiting switch circuit 85 in response to instruction signals inputted from a terminal 86 and terminates the short-circuited state between the substrate potential VGL and the GND potential.

With the provision of the starting auxiliary circuit 80, the substrate potential VGL and the GND potential are directly short-circuited until the power supply voltage formed by the booster circuit is stabilized and, after the power supply voltage formed by the booster circuit is stabilized, the short-circuited state can be released. Accordingly, the latch-up which may be caused by the parasitic bipolar transistor can be prevented and the number of externally mounted parts can be reduced.

To recapitulate the advantageous effects obtained by the representative inventions among the inventions described in this specification, they are as follows.

(1) According to the liquid crystal display device of the present invention, the mounting area of the driving circuits can be reduced and hence, the arrangement of the driving circuit can be freely selected.

(2) According to the liquid crystal display device of the present invention, the number of externally mounted parts can be reduced and hence, it is possible to realize the liquid crystal display device driven by a battery of convenient size for a portable device.

What is claimed is:

1. A liquid crystal display device comprising:
a first substrate including first, second, third, fourth side edge portions;
a second substrate;
a liquid crystal composition which is sandwiched between the first substrate and the second substrate,
a plurality of pixel electrodes which are formed above the first substrate;
switching elements which supply video signals to the pixel electrodes;
video signal lines which extend between the first and fourth side edge portions and supply video signals to the switching elements;
scanning signal lines which extend between the second and third side edge portions supply scanning signals for controlling the switching elements;
a first driving circuit which outputs the video signals; and
second and third driving circuits which output the scanning signals;
wherein the first, second and third driving circuits are disposed along the first side edge portion,
a first scanning signal line extends from the second driving circuit to the second side edge portion,
a second scanning signal line extends from the third driving circuit to the third side edge portion,
in a first mode of operation, the second driving circuit starts sequentially outputting scanning signals to a first half of the scanning signal lines from a scanning signal line closest to the fourth side edge portion to a scanning signal line closest to the first side edge portion before the third driving circuit sequentially outputs scanning signals to a second half of the scanning signal lines from a scanning signal line closest to the fourth side edge portion to a scanning signal line closest to the first side edge portion,
in a second mode of operation, the third driving circuit starts sequentially outputting scanning signals to the second half of the scanning signal lines from the scanning signal line closest to the first side edge portion to the scanning signal line closest to the fourth side edge portion before the second driving circuit sequentially outputs scanning signals to the first half of the scanning signal lines from the scanning signal line closest to the first side edge portion to the scanning signal line closest to the fourth side edge portion, and
the first mode and the second mode of the second and third driving circuit is controlled by an instruction data.

2. The liquid crystal display device as claimed in claim 1, wherein the second driving circuit includes a power supply circuit having booster circuits.

3. The liquid crystal display device as claimed in claim 2, wherein the power supply circuit determines whether voltages outputted from the booster circuits are at specified levels.

4. The liquid crystal display device as claimed in claim 1, wherein the first half of the scanning signal lines are formed in a group separately from the second half of the scanning signal lines formed as another group.

5. The liquid crystal display device as claimed in claim 1, wherein the first and second half of the scanning signal lines are alternately formed on the first substrate.

* * * * *